(12) United States Patent
Asmussen et al.

(10) Patent No.: US 8,314,554 B2
(45) Date of Patent: Nov. 20, 2012

(54) INTEGRATED GAS DISCHARGE LAMP

(75) Inventors: Knut Asmussen, Munich (DE);
Guenther Hirschmann, Munich (DE);
Lars Kolbe, Glonn (DE); Manfred Roehl, Bruckmuehl (DE); Bernhard Siessegger, Munich (DE)

(73) Assignee: Osram AG, Munich (DE)

( * ) Notice: Subject to any disclaimer, the term of this patent is extended or adjusted under 35 U.S.C. 154(b) by 385 days.

(21) Appl. No.: 12/625,725

(22) Filed: Nov. 25, 2009

(65) Prior Publication Data

US 2010/0134010 A1 Jun. 3, 2010

Related U.S. Application Data

(60) Provisional application No. 61/119,320, filed on Dec. 2, 2008.

(30) Foreign Application Priority Data

Nov. 28, 2008 (DE) .......................... 10 2008 059 561

(51) Int. Cl.
*H01J 17/16* (2006.01)

(52) U.S. Cl. ........ 313/634; 313/623; 313/567; 313/636; 313/42

(58) Field of Classification Search .................. 313/567, 313/590, 622, 623, 627, 631, 634–637
See application file for complete search history.

(56) References Cited

U.S. PATENT DOCUMENTS

| 5,659,221 | A | 8/1997 | Coushaine et al. |
| 5,828,174 | A | 10/1998 | Seiler et al. |
| 5,923,127 | A | 7/1999 | Keijser et al. |
| 6,089,887 | A | 7/2000 | Ozaki |
| 6,194,834 | B1 | 2/2001 | Seiler et al. |
| 6,364,515 | B1 | 4/2002 | Daub et al. |
| 6,429,591 | B1 | 8/2002 | Takamatsu et al. |
| 6,919,687 | B2 | 7/2005 | Kika |
| 2004/0046507 | A1 | 3/2004 | Alder et al. |
| 2007/0081345 | A1 | 4/2007 | Wilcox et al. |
| 2008/0309240 | A1 | 12/2008 | Goray et al. |
| 2010/0225242 | A1* | 9/2010 | Saveliev ........................ 315/276 |

FOREIGN PATENT DOCUMENTS

| DE | 8505644 U1 | 6/1985 |
| DE | 19610385 A1 | 9/1997 |
| DE | 19610388 A1 | 9/1997 |
| DE | 19712584 A1 | 10/1997 |
| DE | 19719708 A1 | 11/1997 |
| DE | 19815984 A1 | 10/1999 |
| DE | 202007003937 U1 | 6/2007 |
| DE | 19753605 B4 | 7/2008 |
| DE | 102008002885 A1 | 1/2009 |
| EP | 1081428 B1 | 12/2003 |
| WO | 0227746 A1 | 4/2002 |

OTHER PUBLICATIONS

English machine translation of DE 85 05 644 U1.
Abstract for DE19815984A1.
Abstract for DE19753605B4.
Abstract for DE202007003937U1.

* cited by examiner

*Primary Examiner* — Tuyet Thi Vo

(57) ABSTRACT

Various embodiments relate to an integrated gas discharge lamp including a lamp base, a gas discharge lamp burner and an ignition electronics, wherein the integrated gas discharge lamp includes an operation electronics for operating the gas discharge lamp burner, and the gas discharge lamp burner, the ignition electronics, and the operation electronics are unseparably coupled with each other.

21 Claims, 27 Drawing Sheets

INTEGRATED GAS DISCHARGE LAMP

CROSS-REFERENCE TO RELATED APPLICATION

This application claims priority to German Patent Application Serial No. 10 2008 059 561.6, which was filed Nov. 28, 2008, and is incorporated herein by reference in its entirety. Furthermore, this application claims priority to U.S. Patent Application Ser. No. 61/119,320, which was filed Dec. 2, 2008, and is incorporated herein by reference in its entirety.

TECHNICAL FIELD

The invention relates to an integrated gas discharge lamp having a gas discharge lamp burner and an ignition electronics.

BACKGROUND

Various embodiments start from an integrated gas discharge lamp having a gas discharge lamp burner and an ignition electronics.

From WO2002027746A1 an integrated gas discharge lamp is known, which includes a gas discharge lamp burner and an ignition electronics. A meander-shaped bent printed circuit board finds space in the lamp base of the integrated gas discharge lamp, which accommodates the ignition electronics and a voltage converter. The voltage converter converts the input DC voltage into a square-wave AC voltage for the operation of the lamp. A power regulation of the integrated gas discharge lamp is done using an electronic operation device, which drives the lamp. However, the integrated gas discharge lamp has the disadvantage that the electronics is complex and expensive to manufacture due to the meander-shaped bent printed circuit board, and that the integrated gas discharge lamp further requires an external electronic operation device for the operation.

SUMMARY

Various embodiments provide an integrated gas discharge lamp. The integrated gas discharge lamp may include a lamp base, a gas discharge lamp burner, an ignition electronics, an operation electronics for operating the gas discharge lamp burner, wherein the gas discharge lamp burner, the ignition electronics as well as the operation electronics are unseparably coupled with each other.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

The following detailed description refers to the accompanying drawings that show, by way of illustration, specific details and embodiments in which the invention may be practiced.

Mechanical Integration

Figure 1:
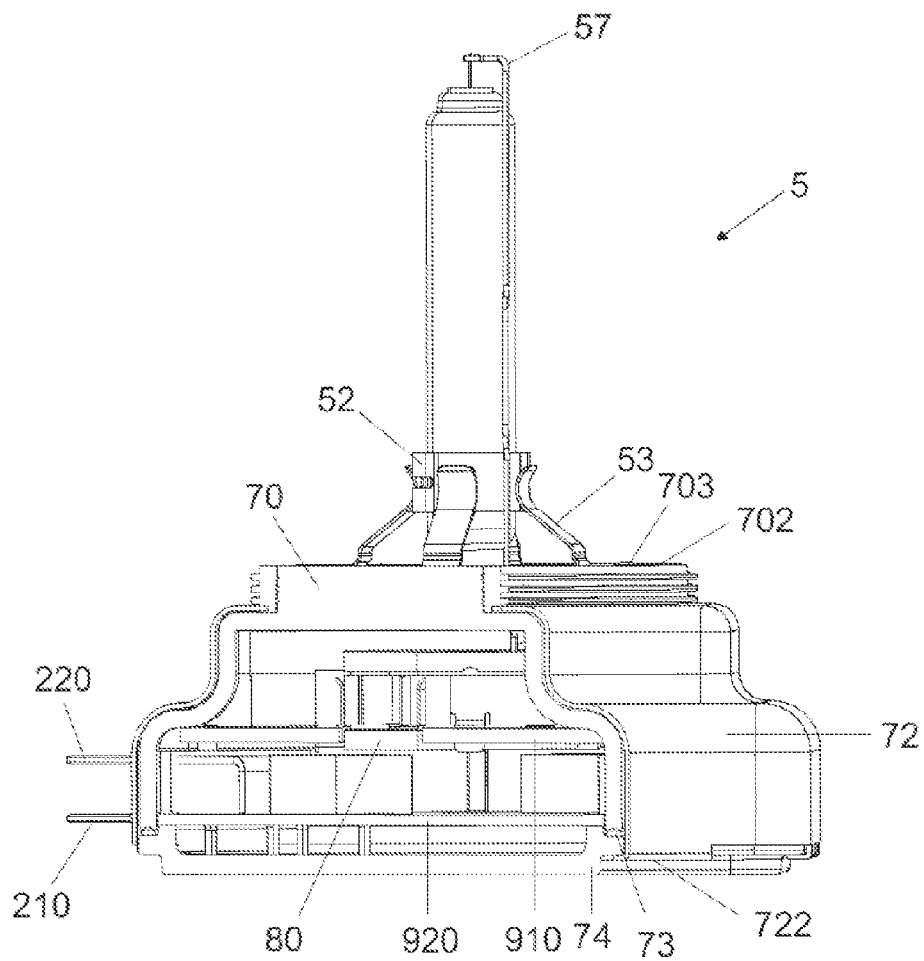
FIG. 1 shows a sectional view of an integrated gas discharge lamp in accordance with the invention in a first embodiment.

FIG. 1 shows a sectional view of a first embodiment of the integrated gas discharge lamp 5. In the following an integrated gas discharge lamp 5 will be referred to as a gas discharge lamp 5, which has integrated both the ignition electronics and the operation electronics in the lamp base of the gas discharge lamp 5. Thus, the integrated gas discharge lamp 5 does include no specific lamp interface towards the outside, but it can be directly connected to generally common and widely used energy supply networks. In a configuration as automobile headlamp the interface of the integrated gas discharge lamp 5, hence is the conventional 12 V supply of the automobile on-board network. In another configuration as automobile lamp, the interface of the integrated gas discharge lamp 5 may also be a future 42 V supply of a modern automobile on-board network. The integrated gas discharge lamp 5, however, may also be designed such that it can be connected to a high-voltage on-board network of an electric car, with an accumulator voltage of, e.g. 48 V, 96 V, 120 V, up to exemplary 360 V. Further, the integrated gas discharge lamp may be configured to operate on an emergency current supply having a battery buffered low-volt-network. Also, this lamp can be used in low-volt isolated networks such as being used e.g. in mountain shelters. Also conventional low-volt-systems, in which up to now low-volt halogen lamps have been used, may be considered here to be applied. Even in portable devices such as in pocket lamps, such a lamp is advantageous, since no wiring is required between the lamp and the operation device. Due to the fact that the cable is omitted, additional costs, wiring effort and unnecessary failure sources are omitted. In the following, an integrated gas discharge lamp 5 also refers to a gas discharge lamp, which has integrated the entire electronics, which is required for the operation, in the lamp itself, so that it can be directly connected to conventional network supply.

A lamp burner 50 is held my a metal clamp 52, which is attached to 4 retaining sheets 53. The retaining sheets 53 are casted, e.g. via injection moulding, into a lamp base 70. The lamp base 70 may consist of plastic, and is manufactured by means of an injection moulding process or a casting process. In order to improve the electric shielding, the plastic of the lamp base 70 can be electrically conductive or metalized. Particularly advantageous is a metallization of the lamp base on the outside and, hence, on the side facing away from the ignition and operation electronics 910, 920. Regarding metallization, also the injection coating of metallic conductors or a metallic meshwork is possible, so that an electrically conductive skin is created to occur in the wall of the lamp base 70. In case no electrically conductive or metalized plastic is used, then the plastic base is enclosed by an electrically conductive casing 72 made of a conductive material, such as metal. The metal e.g. can be a corrosion protected iron sheet or also a non-ferrous metal such as aluminum, magnesium or brass. At the burner side ending of the electrically conductive casing 72, a seal ring 71 is seated, also commonly referred to as O-ring, which provides for sealing towards the reflector. By this measure, a sealed headlamp system can be designed, without the need to build-in the lamp completely into the sealed headlamp. Due to the fact that the lamp is arranged outside on the headlamp, the cooling of an ignition and operation electronics 910, 920 being in the base is much better and simpler as compared with a conventional design, in which the gas discharge lamp 5 is built into a sealed headlamp, in which only a weakly developed cooling convection can take place. The approximately stationary air within the described, sealed headlamp causes a so-called heat accumulation, which leads to substantially higher temperatures of the operation electronics as compared with the proposed embodiment, in which the lamp protrudes into the clear space on the side facing away from the light emitting surface, e.g. into the engine compartment.

The base 70 will be closed by base plate 74 on the side facing away from the lamp burner 50. The base plate 74 e.g. consists of a material which is well conductive thermally as well as electrically, such as aluminum or magnesium. In order to establish a mechanical connection to the base 70 as well as an electrical connection to the electrically conductive casing 72, the latter includes tongues 722 on the side facing away from the lamp burner 50, which during assembling the integrated gas discharge lamp 5 will be bordered onto the base plate 74 and, hence, establish the required connections. Inter alia by this kind of connection system, the lamp burner 50, the ignition electronics 910 and the operation electronics 920 are inseparably connected to each other to form an integrated gas discharge lamp 5. This provides the advantage for the motor vehicle manufacturer that, compared to conventional systems consisting of operation device and gas discharging lamp, the integrated gas discharge lamp 5 is only one part regarding logistics and assemblage, and the reduced complexity provides for reduced costs, and the danger of confusion between components of same function but different design, such as different product versions of the operation devices, is eliminated. From this, there results the advantage for the end customer, for example for the vehicle's owner, that the reduced complexity substantially facilitates and accelerates replacement of a faulty integrated gas discharge lamp as compared to prior art and facilitates debugging, and less knowledge and skills are required for performing a lamp replacement. The omission of the cables as well as of the plug connectors between the components further reduces the costs, increases reliability and reduces weight.

The base plate is e.g. made of aluminum die cast or of magnesium die cast. This provides a variant which is cost-efficient as well as which is of mechanical and electrical high-value. A well electrically conductive connection between the lamp base 70, which at least at its surface is electrically conductive, or the electrically conductive casing 72 and the base plate 74, which is electrically conductive too, is in particular required for a good electromagnetic shielding. This shielding prevents the disturbance of adjacent electrical or electric assemblies. Further, the shielding ensures that the assemblies do not have a negative influence on the function of the ignition and operation electronics 910, 920. A seal ring 73 is disposed between the base plate 74 and the base 70, which ensures a water and air tight connection between the base 70 and the base plate 74. In an alternative embodiment, the base 70 and the base plate 74 are designed such that both parts are catch-lockable to each other, wherein in the catch-locked position there are simultaneously one or more contact points between the electrically conductive casing 72 and the base plate 74 in order to generate a good connection for the electrical shielding. Also in this case, a seal ring is again disposed between the base and the base plate, which ensures tightness of the base on the side facing away from the gas discharge lamp burner 50. Two levels are provided in the interior of the base, which receive the ignition and operation electronics. A first smaller level, which is arranged closest to the lamp burner 50, receives the ignition electronics 910 having the ignition transformer 80. The structure of the ignition transformer 80 will be discussed later. A second larger level receives the operation electronics 920 required for the operation of the discharge lamp burner 50. The ignition and operation electronics may be arranged on any appropriate kind of circuit board, also called printed circuit board. Possible are conventional circuit boards, metal core circuit boards, circuit boards using LTCC-technology, oxidized or coated metal boards having conductor paths using thick zone technology, plastic circuit boards using MID or MID hot foil stamping, or appropriate other possible technologies for manufacture of temperature stable circuit boards. The electronic components or parts which form the ignition and operation electronics, may be respectively on the upper and lower sides as well as in the interior of the two circuit boards. In FIG. 1, for a better clarity, except for the transformer 80, no further electronic components or parts are depicted on the printed circuit board. Insofar as the printed circuit board for the ignition electronics 910 and the printed circuit board for the operation electronics 920 consist of the same material, they may e.g. be made on the same blank. In this respect, bridges may be placed between the printed circuit boards, which during marshalling into singles and installing into the lamp base 70 serve as electrical connections between the printed circuit boards. Single wires, ribbon lines or rigid-flexible circuit boards may serve as bridges. The electrical connection of the two circuit boards is provided such that it can comply with a distance variation between the two circuit boards, particularly by means of thermal cycle stress, without being damaged. Hereunto, the wires for example are to be provided with sufficient length and with corresponding arrangement with the casing. Alternatively, one or more pin and socket rails may be used, which are dimensioned and arranged such that they allow a thermal expansion in the direction of the longitudinal axis of the gas discharge lamp burner and nevertheless ensure an electrical connection in all events. Hereunto, the pins of the pin rail are arranged perpendicular to the respective circuit board surface, and the insertion length of the sockets is dimensioned such that they provide for more way for the pins than the latter require in the sockets due to thermal expansion.

The printed circuit board for the ignition electronics 910 includes an electrically conductive shielding surface on the side facing the operation electronics in order to keep away interferences from the operation electronics as possible, which occur due to the high voltage in the ignition electronics. This surface is inherently present in a metal or metal core circuit board, wherein in other circuit board materials this side is e.g. coated with a copper surface or similar. When using a metal core circuit board, then the ignition transformation 80 can also be cooled therewith, which because of its proximity to the gas discharge lamp burner is exposed to a particularly high thermal stress. An electrically conductive shielding surface between the ignition electronics 910 and the operation electronics 920 may alternatively be established by a metallic sheet which is inserted between the two circuit boards and which e.g. is connected to the electrically conductive casing 72 in an electrically conductive manner. If this shielding surface is intended to additionally serve for cooling the ignition transformer 80, then it is of advantage if the metallic shield also provides for good thermal connection, for example by means of heat conducting foil or heat conducting paste, to the electrically conductive casing 72.

The printed circuit board for the operation electronics 920 is clamped between the base 70 and the base plate 74. The printed circuit board for the operation electronics 920 includes a circumferential ground conductor path respectively on the upper and lower sides of its circumference, that is, so-called ground rings, which are connected to each other in electrically conductive manner due to through contacts. These through contacts are commonly referred to as vias and are electrical contacts which extend through the printed circuit board. This ground rings provide an electrical contact to the base plate 74 by means of the clamping between the base 70 and the base plate 74, whereby the ground connection of the operation electronics to the electrically conductive casing 72 is ensured via the bordered tongues 722.

Figure 2:
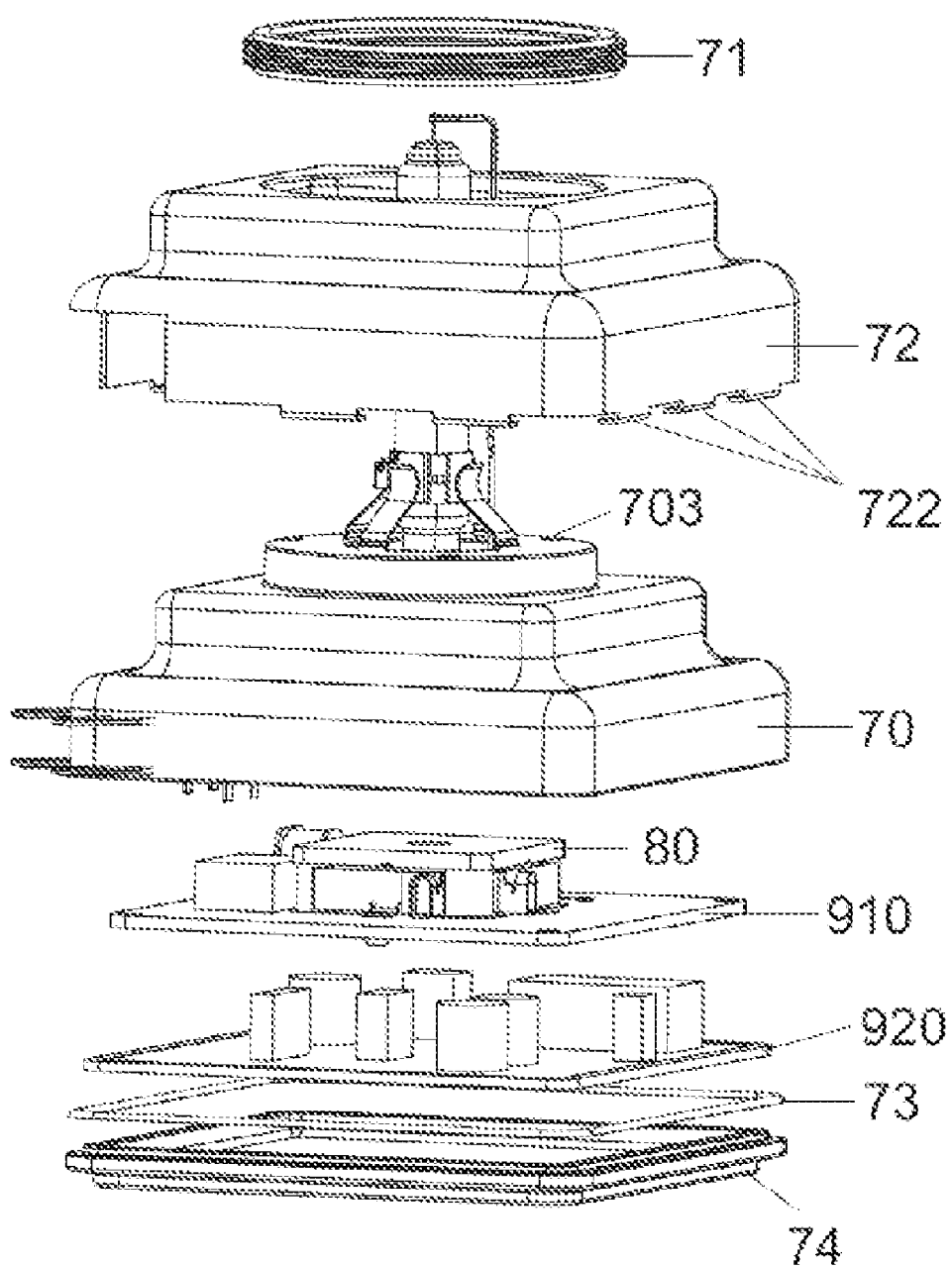
FIG. 2 shows an exploded view of the mechanical components of the integrated gas discharge lamp in the first embodiment.

FIG. 2 shows an exploded view of the mechanical components of the integrated gas discharge lamp 5 in the first embodiment. In this case, the base is quadrangular, but in principle it can also have many other appropriate shapes. Particularly appropriate further embodiments would be round, hexagonal, octagonal or rectangular. For determining the outer contour of the embodiment, a fictive section is made through the casing part containing the electronics perpendicularly to the longitudinal axis of the gas discharge lamp burner 50, and the resulting outer contour is considered, wherein roundings at the edges of the casing are to be neglected. In the case of the first embodiment as depicted in FIGS. 1 and 2, there arise two quadrats in dependence from the fact whether the selected sectional plane is closer to the ignition electronics 920 or closer to the operation electronics 920. Therefore, the first embodiment is referred to as quadratic embodiment. The first resulting outer contour proximal to the ignition electronics 910 is smaller than the second one, which is substantially due to the fact that the printed circuit board of the ignition electronics 920 has smaller dimensions than that of the operation electronics 910. However, this is not necessarily the case, and an embodiment is possible, in which the two outer contours are of same size and, therefore, in which there is only one outer contour. Also, the two geometries of the outer contours do not have to be identical in the different areas. In particular, a small round outer contour in the area of the ignition electronics and a larger hexagonal outer contour in the area of the operation electronics appear to be a particularly advantageous embodiment.

In this regard, as explained above, the printed circuit board for the operation electronics 920 is clamped between the base 70 and the base plate 74. The seal ring 73, like the printed circuit board for the operation electronics 920, comes to be arranged between the base 70 and the base plate 74, and is arranged outside of the printed circuit board for the operation electronics 920.

Figure 3:
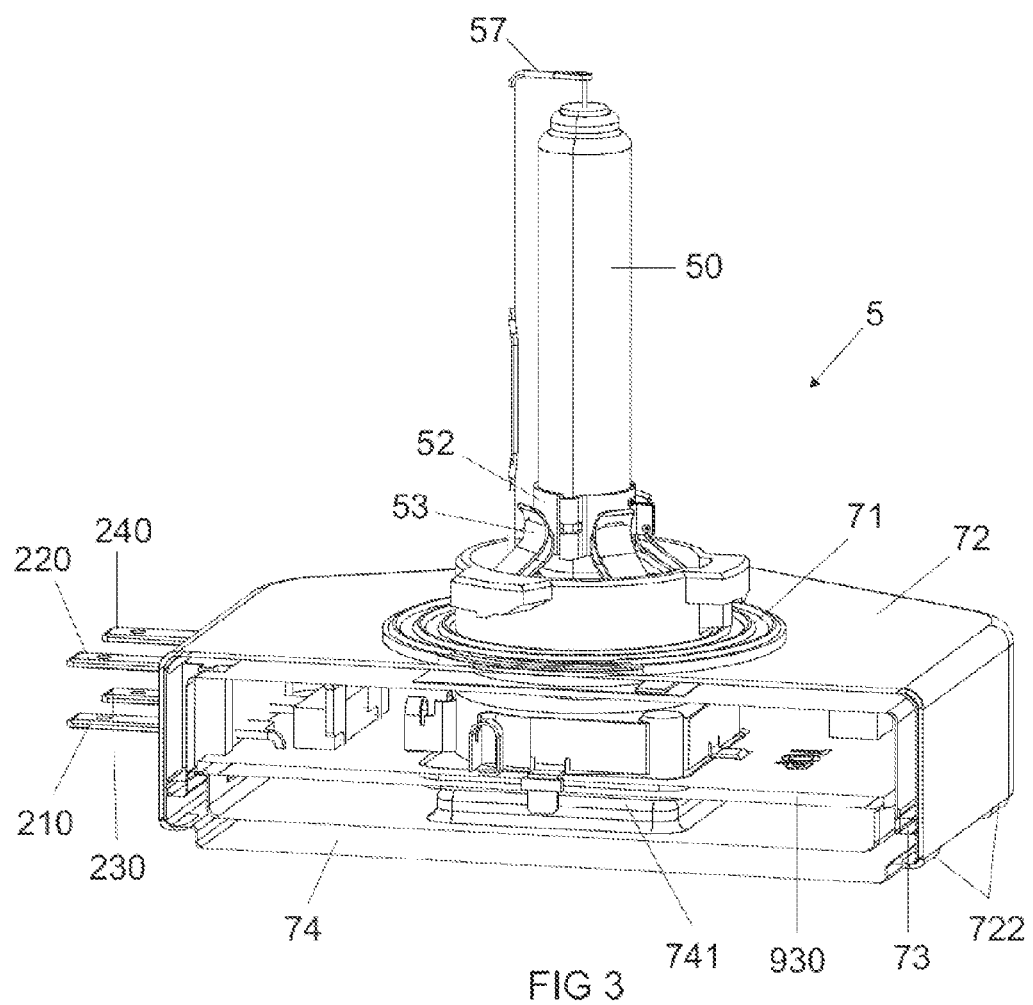
FIG. 3 shows a sectional view of an integrated gas discharge lamp in accordance with the invention in a second embodiment.

FIG. 3 shows a section view of a second embodiment of the integrated gas discharge lamp 5. The second embodiment is similar to the first embodiment and, hence, only the differences to the first embodiment will be described. In the second embodiment, the ignition electronics 910 and the operation electronics 920 are arranged on a common level on a circuit board as an overall operation electronics 930. By this measure the base of the gas discharge lamp 5 according to the invention may be provided more flat, whereby also a headlamp, which applies this discharge lamp 5, also has less depth. In this respect, the ignition transformer 80 is arranged centrally below the gas discharge lamp burner 50. In this case, the center of the ignition transformer 80 is e.g. arranged in the longitudinal axis of the gas discharge lamp burner 50. In this regard, the current supply for the gas discharge lamp burner electrode proximal to the base positioned extends into the middle portion of the ignition transformer. The ignition transformer is not mounted on the printed circuit board, but is arranged with its end distal from gas discharge lamp burner approximately at the same level as the side of the printed circuit board, which faces away from the gas discharge lamp burner. Hereunto, the printed circuit board of the overall operation electronics 930 is recessed at this position so that the ignition transformer 80 is inserted into the printed circuit board of the overall operation electronics 930. For improving the electromagnetic compatibility the casing may be provided with walls and chambers, for example by means of webs of aluminum sheet or Mu-metal, whereby an electrical, magnetic and electromagnetic shielding of different circuit parts against each other or against the surroundings may be provided. The shielding may also be provided by other measures, in particular the formation of cavities in the base plate 74 as well as in the lamp base 70 can easily be realized in connection with the injection mould process.

The remaining hollow chambers within the casing of the integrated gas discharge lamp 5, in particular around the ignition transformer 80 and on both sides of the overall operation electronics 930, are filled with casting compound. This has several advantages, such as, for example, electrical flashovers, in particular due to the high voltage created by the ignition transformer, are safely prevented, a well de-heating of the electronics is ensured, and highly mechanically sturdy unity is provided, which very well resists in particular environmental influences such as humidity and high accelerations. However, in particular for reduction of the weight, there may also be realized a partly casting, for example in the area of the ignition transformer 80.

Figure 8:
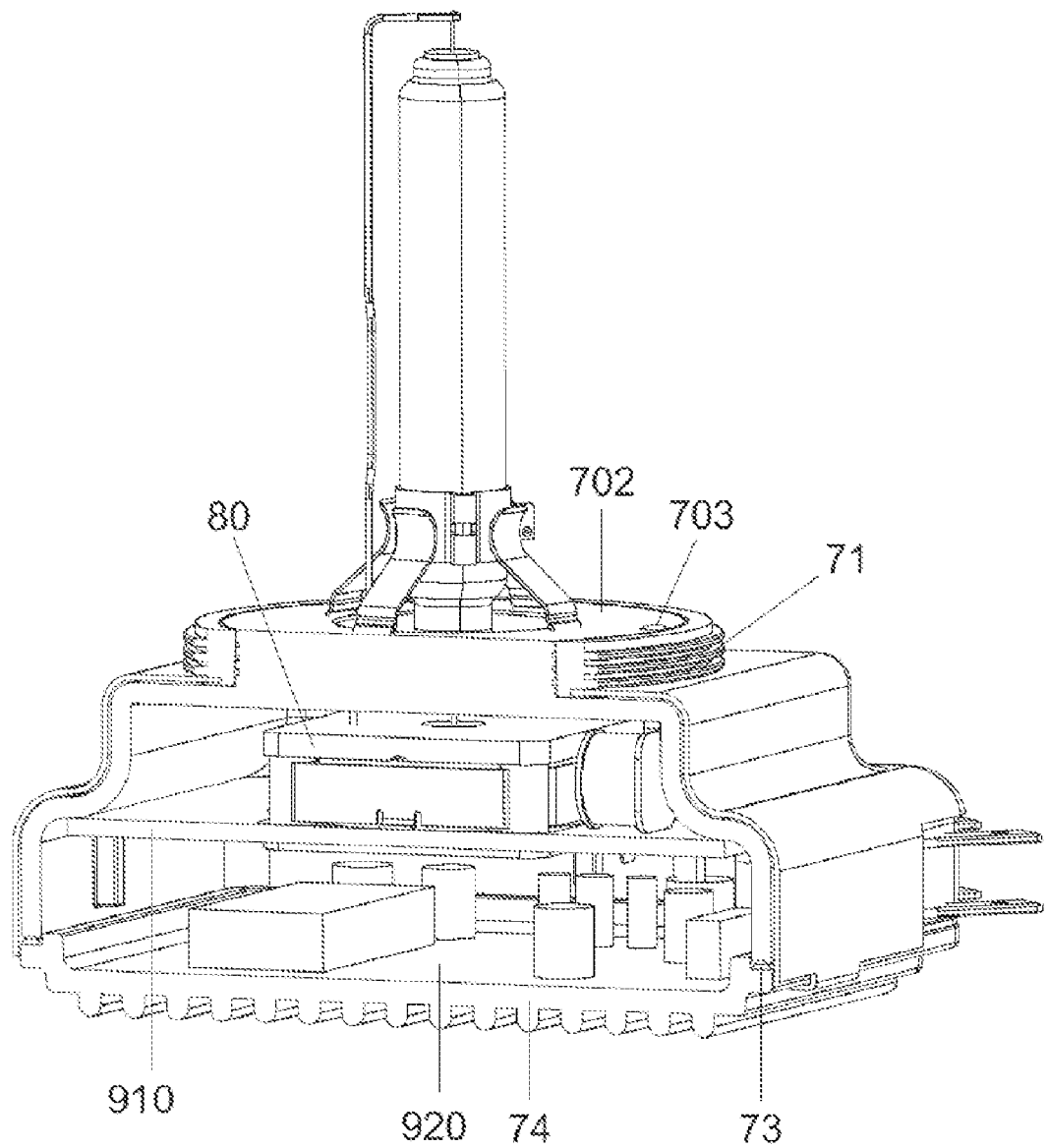
FIG. 8 shows a sectional view of a third embodiment of the integrated gas discharge lamp.

FIG. 8 shows a third embodiment of the integrated gas discharge lamp 5 according to the invention. The third embodiment is similar to the first embodiment and, hence, only the differences to the first embodiment will be described. In the third embodiment, the base plate 74 is provided with cooling ribs on its outside. It is also possible, that the lamp base 70 and the electrically conductive casing 72 are respectively provided with cooling ribs, too. In addition, the function of the printed circuit board of the operation electronics 920 is also provided by the base plate, since the latter includes electrically non-conductive areas on its inner side, for example areas of anodic oxidized aluminum, which are provided with structures, such as with conductor paths using thick zone technology, and which are connected to the components of the overall operation electronics in an electrically conductive manner, for example by means of soldering. By this measure, the operation electronics 920 is particularly well cooled, since it is directly applied to a cooling body. The cooling ribs are e.g. designed such that a natural convection is promoted in the fitting position of the integrated gas discharge lamp 5. If the integrated gas discharge lamp 5 has to be able to be operable in different fitting positions, then the cooling surface may also be correspondingly designed and, e.g., may consist of round, hexagonal, quadratic or rectangular fingers, so that a natural convection can take place in several directions in space. The ignition electronics 910, like in the first embodiment, is placed on a circuit board arranged thereabove, and is electrically connected to the operation electronics 920 by means of appropriate measures. This may be performed by spring contacts or plug contacts, but also by conductor paths extending within the base or by conductor paths printed onto the inner side of the base, which will be connected to the ignition electronics 910 and the operation electronics 920.

Figure 9:
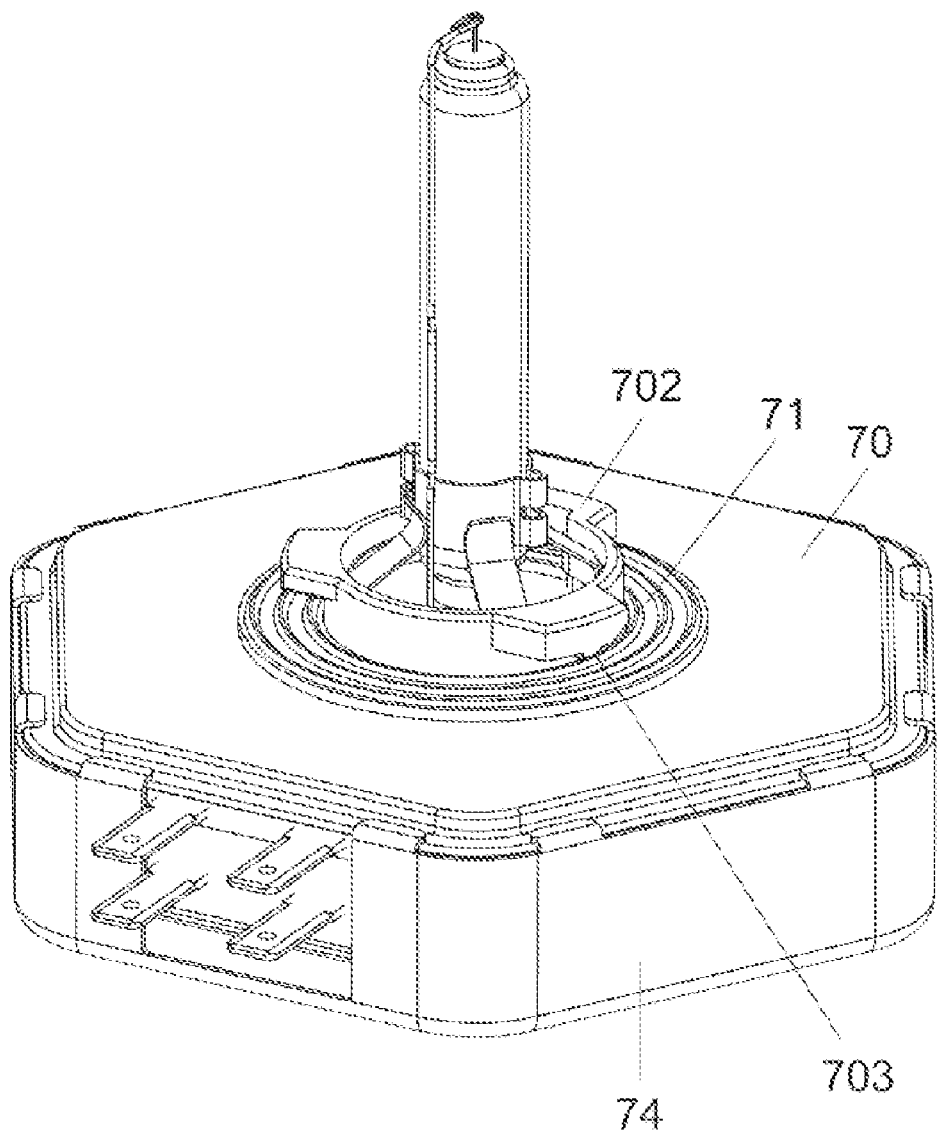
FIG. 9 shows a perspective view of an integrated gas discharge lamp in accordance with the invention in a fourth embodiment.

FIG. 9 shows a fourth embodiment of the integrated gas discharge lamp 5 according to the invention. The fourth embodiment is similar to the second embodiment and, thus, only the differences to the second embodiment will be described. In the fourth embodiment, the base plate 74 is realized by a metal core circuit board which is fitted with components on the inner side and, hence, as in the previous embodiment, correspondingly on one side. The base plate 74, however, is not anymore a plate as in FIG. 4, but is a case cup having brought-up side walls. For the reason of better clarity, the base plate in the following will be referred to as base cup. The base cup may also be made of a thermally well conductive material. Particularly suitable are metal alloys which can be well deformed, for example by means of deep-drawing. Also well suitable is a thermally well conductive plastic which can be brought into shape by means of injection moulding. The base 70 having the reference ring 702 and the reference knobs 703 in this embodiment substantially consists hexagonal plate, on which the burner is adjusted with the reference ring and is attached. The base burner accommodates the overall operation electronics 930 which is placed on an own circuit board or on the inner bottom of the base cup. Plug contacts are arranged on the current supplies 56, 57 of the gas discharge lamp burner 50, which during assembling the base cup, will engage with corresponding counter contacts of the base cup and establish a reliable contact.

If the base cup and the base 70 are made of metal, then the both parts may be connected by bordering, like in a coffee can or can. However, also several tongues of the base cup may be bordered to the base, like in FIG. 9, in order provide for a good mechanical as well as electrical connection. However, for the manufacture of the connection there may also be used known soldering and welding processes.

If the base cup and the base 70 are made of plastic, then the connection may be performed by means of ultrasonic welding. This results in a reliable and fix connection which in case of a conductive plastic also implies a conductive connection. However, the connection may also be established by corresponding catch-locks, wherefore corresponding locking noses and recesses are then to be provided on the base cup and the base.

In the following, the diameter (D) and the height (h) of the integrated gas discharge lamp 5 will be defined substantially independently from the geometry in order to allow an easier description. The height (h) of the integrated gas discharge lamp means the maximum distance of the reference plane, which will be discussed in more detail below, to the outer side of the base plate (74), facing away from the burner. The diameter (D) means the longest distance within the integrated gas discharge lamp, wherein the distance is within an arbitrary plane, wherein this distance extends parallel to the reference plane.

The following table shows some geometrical parameters of different configurations of the fourth embodiment of the gas discharge lamp 5 as depicted in FIG. 9:

|  | Diameter | Length or Height h | Volume | Mass | D/h |
|---|---|---|---|---|---|
| A. 50 W-Lamp | 100 | 35 | 275 | 510 | 2.86 |
| B. 35 W-Lamp | 100 | 25 | 196 | 178 | 4.00 |
| C. 25 W-Lamp, Variant Standard | 70 | 25 | 99 | 139 | 2.80 |
| D. 18 W-Lamp, Variant super-flat | 100 | 15 | 120 | 168 | 6.67 |

-continued

|  | Diameter | Length or Height h | Volume | Mass | D/h |
|---|---|---|---|---|---|
| E. 45 W-Lamp, Variant coffee can | 40 | 50 | 63 | 52 | 0.80 |
| F. 7 W-Lamp, Use in pocket lamp | 40 | 35 | 44 | 36 | 1.14 |

The electrical power from 7 W to 50 W, mentioned in the table, of the difference configurations are related to the nominal electrical power of the gas discharge lamp burner. In this respect, different geometries and sizes of the same type of gas discharge lamp burner are used.

Figure 4:
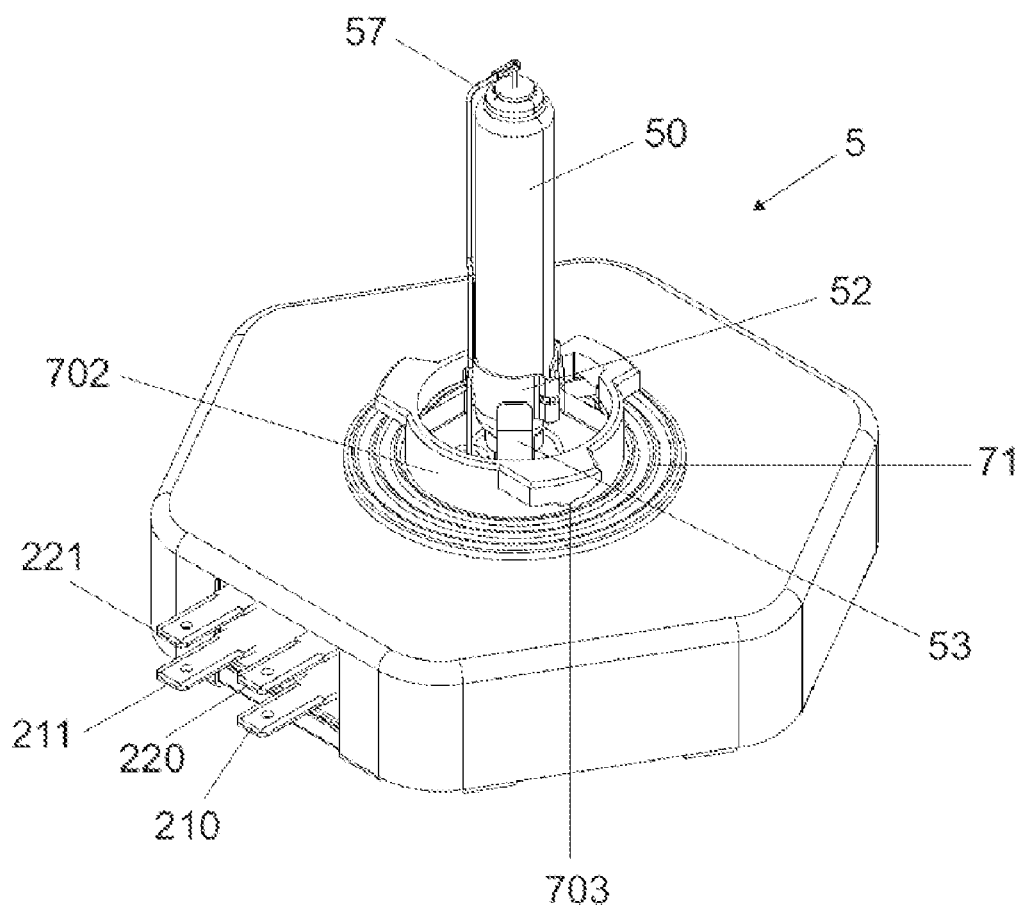
FIG. 4 shows a perspective view in accordance with the invention in a second embodiment.

As is well apparent from FIG. 4, the lamp base of the integrated gas discharge 5 according to the second and fourth embodiments has a hexagonal shape which provides for several advantages. On the one hand, the integrated gas discharge lamp 5 can be easily gripped to be inserted into its application space. On the other hand, the blank of the printed circuit board of the integrated overall operation electronics 930 can be designed such that only a small scrap and, thereby, a good cost-efficiency is possible. Due to the flat configuration of the base, a very shortly structured headlamp can be shaped, which is in particularly an advantage in modern motor vehicles. The point-symmetrical hexagonal shape in this application has all advantages of a round shape, without having the disadvantages of the latter.

As depicted in FIGS. 3 and 4, on one side of the base 70 of the lamp contacts 210, 220 protrude from the base in a manner radial to the longitudinal axis of the gas discharge lamp burner 50. They serve for the provision of electrical contacts between the integrated gas discharge lamp 5 and a headlamp. These contacts are coated via injection in connection with a plastic injection-molding process during manufacturing the lamp base 70. This has the advantage that no specific plug system is required, wherein, however, the water and air tight encapsulation, as already described further above, can be ensured.

Figure 5:
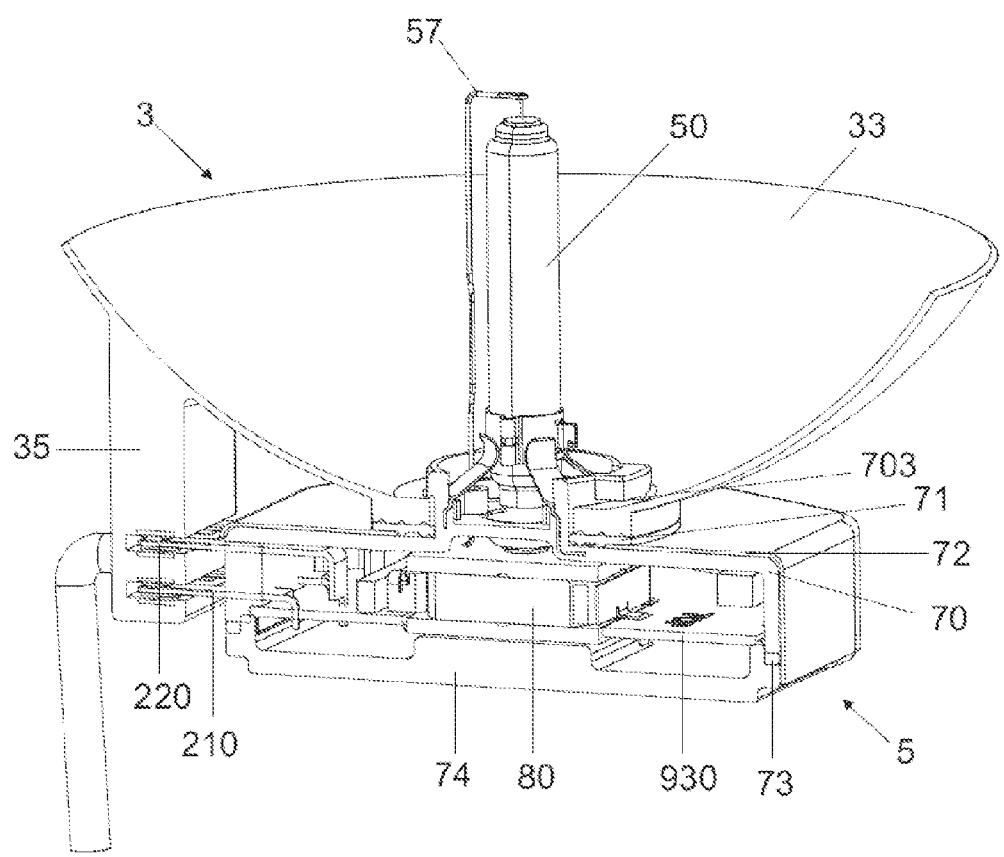
FIG. 5 shows a view of the interface headlamp/gas discharge lamp.
Figure 7:
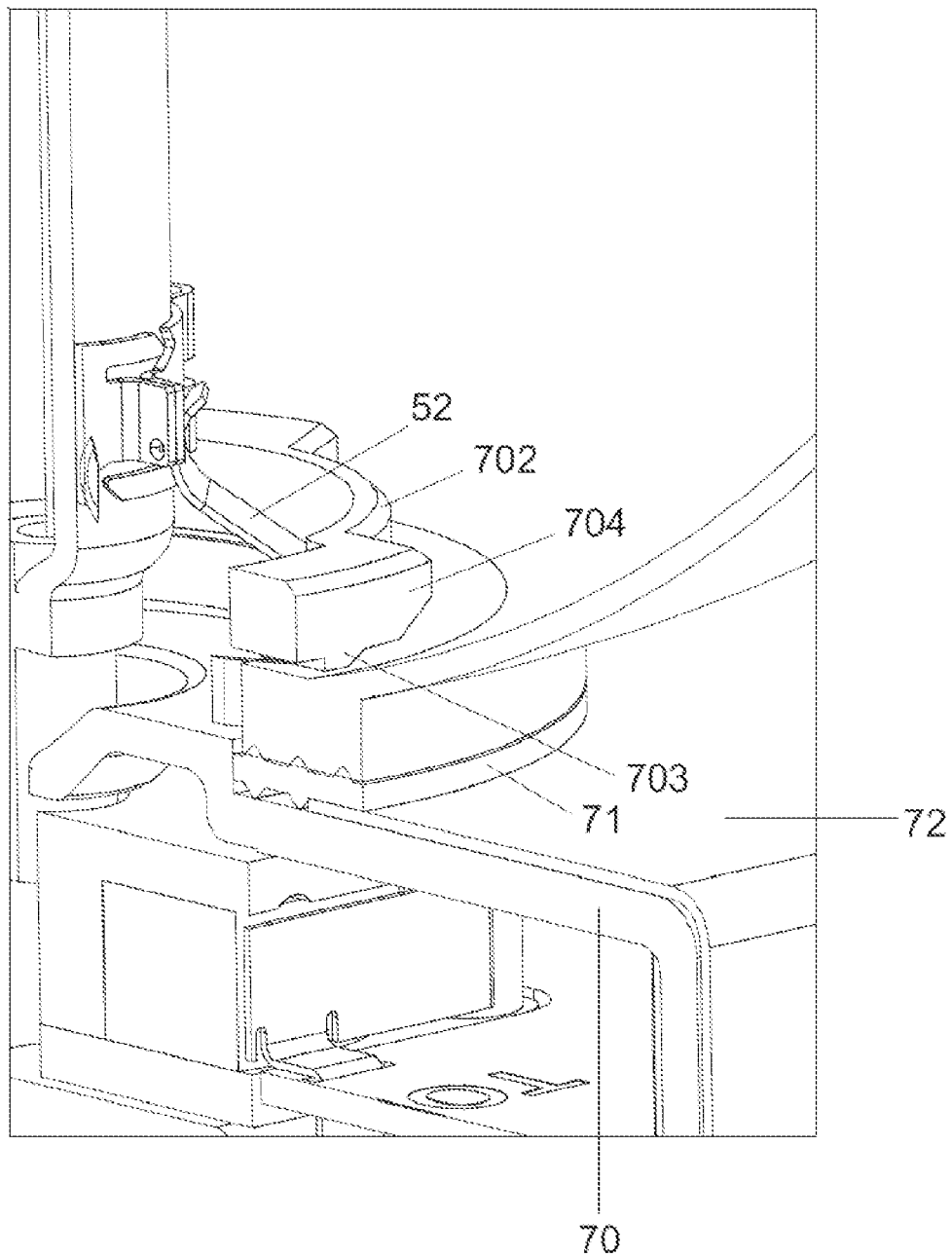
FIG. 7 shows a detailed view of the mechanical contacting.

The lamp interface and interaction between the integrated gas discharge lamp and headlamp 3 are shown in FIG. 5. The gas discharge lamp 5 in the second embodiment has a specific electric interface, via which it is supplied with electrical power. The electric interface is provided such that, when inserting the gas discharge lamp 5 into the head lamp 3, it will not only be mechanically connected to the head lamp 3, but will simultaneously be electrically connected. The similarly structured interface is also used in modern halogen incandescent lamps for automobile headlamps and, for example, sold under the name "Snap Lite" by the firm Osram. Hence, if the integrated gas discharge lamp 5 is inserted into a reflector or into a headlamp, then during the insertion process all mechanical and electrical contacts required for a proper operation are connected to their corresponding counter contacts provided in the headlamp. The base 70 includes knobs 703 provided on its interface to the headlamp 3 and protruding from a reference ring 702, which define a reference plane. A detailed diagram is shown in FIG. 7. These three knobs abut a corresponding counter part of the head lamp 3 during inserting the integrated gas discharge lamp 5. The electrodes and the discharge arc of the gas discharge lamp burner 50 are adjusted with reference to the reference plane in the manufacturing process of the integrated gas discharge lamp. Thereby, the light arc of the integrated gas discharge lamp 5 takes a defined position in the reflector during its insertions into the headlamp, which allows a precise optical imaging. The insertion into the headlamp is performed in the second embodiment according to FIGS. 3 and 4 by inserting the tongues 704, laterally protruding from the reference ring, through the reflector arc of a reflector 33 of the headlamp 3. Thereafter, a rotation of the integrated gas discharge lamp 5 is performed relative to the reflector 33, whereupon the knobs 703, which are provided on the surface of the tongues 704 facing the base, draw the integrated gas discharge lamp inwardly and, at the end of the rotation, lock into correspondingly provided reference surfaces at the reflector basis. The seal ring 71 is thereby compressed and maintains the system at a tension such that the knobs are pushed against the reference surfaces being in the reflector basis. Therefore, the position of the integrated gas discharge lamp 5 and, thus, of the discharge arc of the gas discharge lamp burner 50 relative to the reflector 33 is precisely adjusted and fixed. The high repetition accuracy of the mechanical positioning of typically better than 0.1 mm in all three directions of space of the described headlamp interface allows a realization of an optical high-quality headlamp system. Such a headlamp system can in particular be applied in a motor vehicle, since in the corresponding configuration it includes a distinctive and well defined bright-dark-border.

Figure 6:
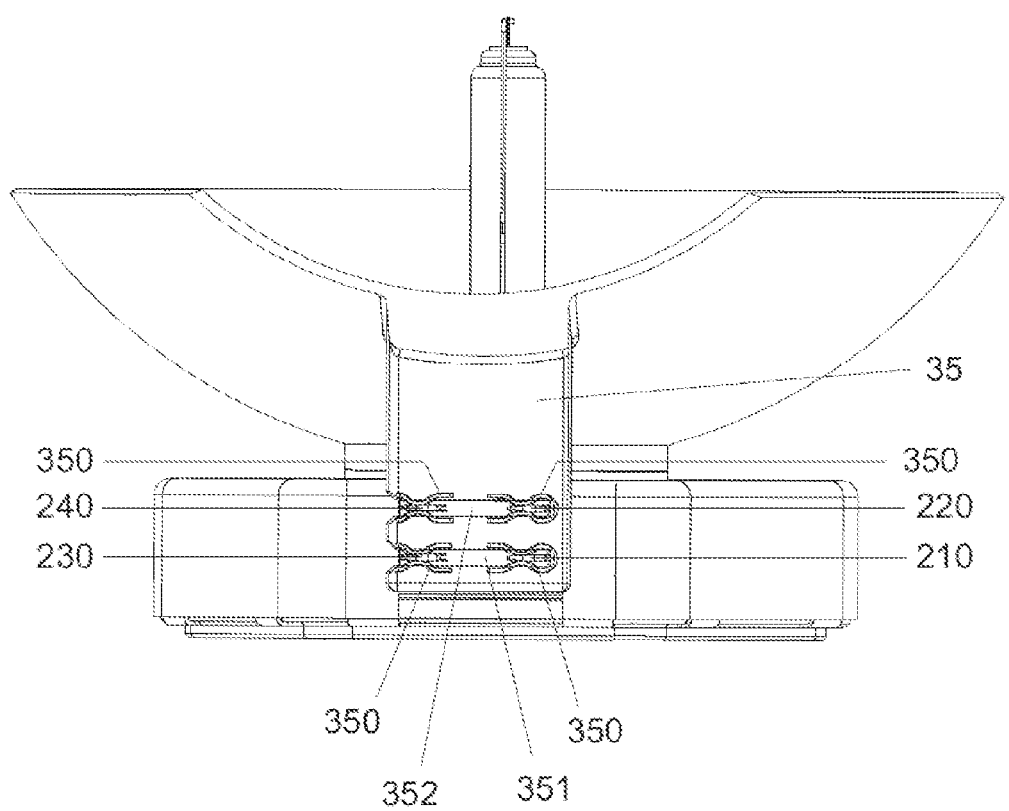
FIG. 6 shows a detailed view of the electrical contacting.

In this respect, a suitable headlamp 3 includes a light guiding means in form of a reflector 33, an accommodation for the integrated gas discharge lamp 5, and a carrier 35, wherein a connection element having counter contacts for the electrical contacts 210, 220, 230, 240 of the integrated gas discharge lamp 5 is arranged on the carrier. The electrical contacts 210, 220, 230, 240 of the integrated gas discharge lamp 5 protrude from the lamp base 70 in a manner radial to the longitudinal axis of the gas discharge lamp burner 50. They serve for the electrical energy supply of the overall operation electronics 930. After assembling the integrated gas discharge lamp 5 in the headlamp by means of an assembling process which substantially includes an insertion motion followed by a rotational motion to the right, its contacts 210, 220, 230, 240 are arranged in the slits 351, 352 of the connection element 35, as can be seen from the detail drawing in FIG. 6. These slits 351, 352 are slits for the electrical counter contacts 350 to the contacts 210, 220, 230, 240 of the integrated gas discharge lamp 5. Thereby, the plugs having connection cables for contacting the integrated gas discharge lamp 5 of the prior art are omitted in the headlamp. In particular, the electrical contacts of the integrated gas discharge lamp 5 are immediately brought in contact with their counter contacts 350 of the connection element on the carrier 35 when being inserted into the headlamp. Thereby, the mechanical stress of the electrical connections due to freely swinging cables is reduced. Further, the number of required connection cables per headlamp is reduced and, hence, the danger of confusion during manufacture is reduced. In addition, this measure allows a higher degree of automation in the manufacture of the headlamp, since less cables have to be mounted manually. Instead of supplying energy to all light sources in the headlamp by means of a plug plugged onto the lamp base and provided with a connection cable, as it is the case in prior art up to now, in the headlamp according to the invention, it is sufficient to connect available electrical supply contacts of the headlamp to the on-board line voltage in order to supply the integrated gas discharge lamp 5 with energy. The supply of the lamps provided in the headlamp via the supply contacts of the headlamps is provided by means of stationary wiring in the headlamp. Thereby, the cabling of the headlamp 3 and of the integrated gas discharge lamp 5 is highly simplified.

The first variant of the lamp in FIGS. 1 and 2 shows another variant of the mechanical adjustment. In this case, the knobs 703 are arranged on the side of the reference ring 702 facing the gas discharge lamp burner 50. In this variant, the knobs 703 come to be abutted on corresponding counter surfaces at the rear side of the reflector in order to thereby define the position of the integrated gas discharge lamp 5 with respect to the reflector 33. In this respect, the integrated gas discharge lamp 5 is pressed from the rear against the reference surfaces of the reflector 33. This variant, however, has the disadvantage that the position between the optical effective inner side of the reflector and the reference surfaces at the rear side of the reflector has to be very precisely tolerated in order to achieve a precise optical imaging.

The system of the headlamp interface of the second embodiment is also suitable to establish a further simplified cabling in modern bus systems. In this respect, the integrated gas discharge lamp 5, in addition to the two electrical contacts 210, 220 has further contacts 230, 240, via which a communication with the onboard electronics of the motor vehicle is performed. The connection element 35 has two slits 351, 352 correspondingly with respective two counter contacts. In a further embodiment, not shown, only three electrical contacts are provided on the lamp, wherein two of which substantially serve the supply of electrical lamp power, and a logic input, also referred to as remote-enable-pin, by means of which the lamp can be switched on and switched off by the onboard electronics in an approximately non-volatile manner.

This "Snap Lite" interface, in addition to the advantage that a mix-up of electrical connections is excluded, has a still further advantage in that, since the lamp is only then supplied with power when it is in its designation place in the headlamp, the current supply 57 of the gas discharge lamp burner 50 facing away from the base can only be contacted when the integrated gas discharge lamp 5 is out of action. The safety in handling such a high pressure discharge lamp is thereby dramatically increased. Due to the easy installation of the integrated gas discharge lamp 5 in the headlamp 3, the end customer is enabled, to replace such a lamp. Thereby, the integrated gas discharge lamp 5 is more cost-efficient for the end customer, since no garage has to be consulted for replacing the lamp.

By inserting the integrated gas discharge lamp 5 into the reflector 33 the ground connection of the lamp to the headlamp casing is additionally established. For example, this can be realized by spring sheet strips attached to the reflector 33 and connected to the ground potential of the vehicle. During insertion of the lamp into the headlamp the spring sheet strips contact the electrically conductive casing surface of the integrated gas discharge lamp 5 and establish electrical connection between the vehicle ground and the internal ground or ground shielding of the integrated gas discharge lamp. For example, the provision of the contact may be provided on the lateral wall or on the end side of the casing 72. In the present case, the ground connection is provided by means of wire ring 71 which is conductive. If the casing surface is electrically non-conductive or is not completely electrically conductive, the provision of the contact of the spring sheet strips is provided on a contact surface on the casing surface of the integrated gas discharge lamp. This contact surface or these contact surfaces include an electrically conductive connection to the internal ground or the ground shielding of the integrated gas discharge lamp.

Figure 31:
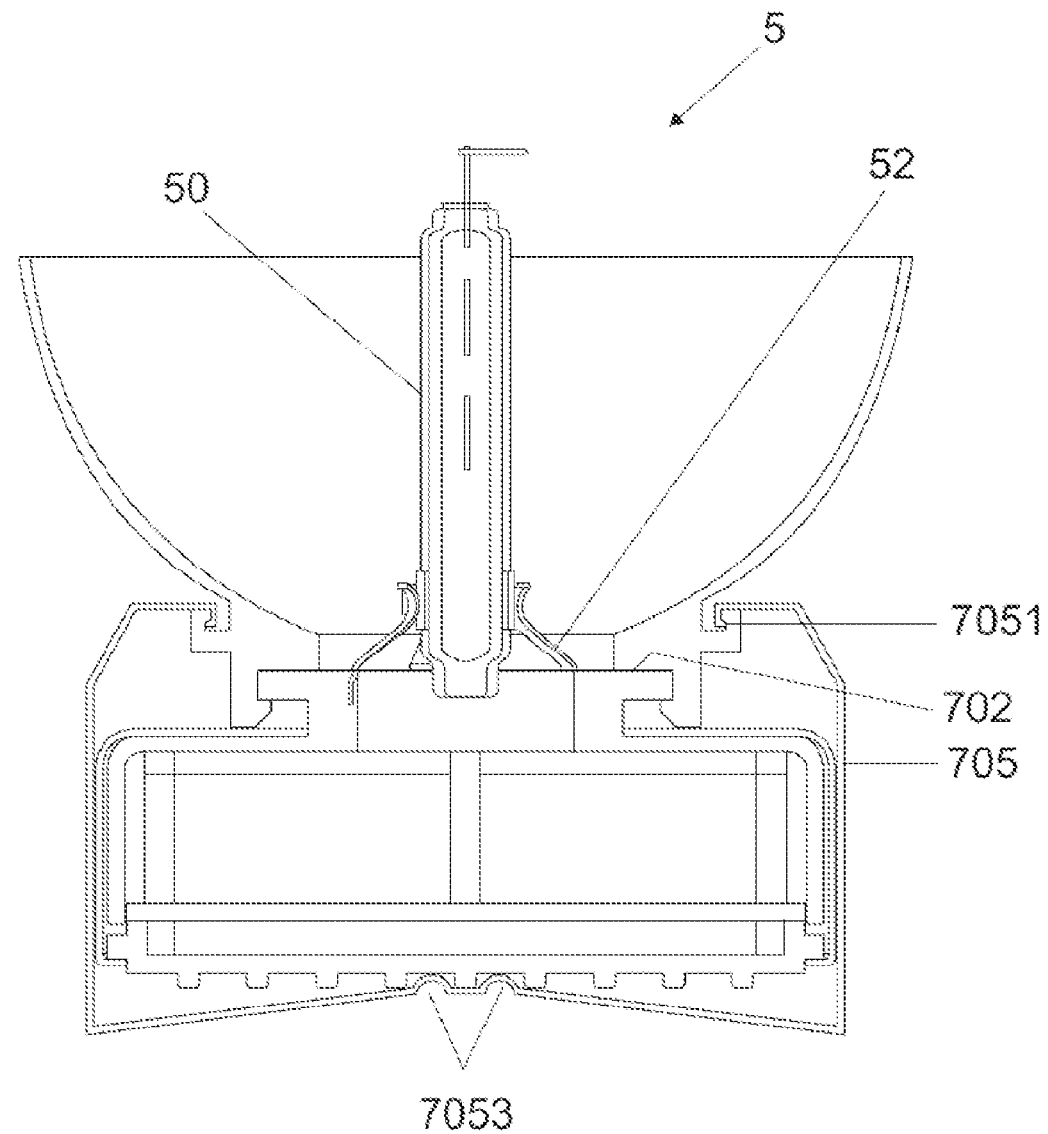
FIG. 31 shows a sectional view of an integrated gas discharge lamp in accordance with the invention in a fifth embodiment.

A fifth further embodiment having a conventional interface to the headlamp is shown in FIG. 31. In this case, the integrated gas discharge lamp 5 is pressed with its reference surface 702 onto a corresponding counter surface of the headlamp accommodation by means of a retaining clamp 705. The integrated gas discharge lamp 5 will be electrically connected to the headlamp in conventional manner. By means of the retaining bracket 705 the integrated gas discharge lamp 5 is well connected with its reference surface 702 to the accommodation of the headlamp, whereby a precise orientation of the electrodes is provided in the optical system of the headlamp. The electrodes 504 of the gas discharge lamp burner 50 of the integrated gas discharge lamp 5 are adjusted with reference to the reference surface 702 during the manufacturing process of the integrated gas discharge lamp 5. Thereby, the light arc of the integrated gas discharge lamp 5, when the latter is being inserted into the headlamp, takes a defined position in the reflector, which allows a precise optical imaging. By the spring effect of the retaining clamp 705 this imaging is also ensured under aggravated conditions, such as vibrations which may occur in an automobile headlamp. The retaining clamp, on the headlamp side, in turn is hooked into a groove 7051, by which it is safely retained, but from which it can be easily hooked-off during lamp replacement. On the bottom side, the retaining clamp 705 engages into the base plate 74 by means of two projections 7053. However, it is also possible that the retaining clamp 705 has no projections and, hence, abuts onto the ribs of the base plate. By means of the fifth embodiment of the gas discharge lamp 5 according to the invention, an easy and cost-efficient connection to a headlamp can be realized, which does not include any restrictions with regard to the positioning accuracy in the optical system of the headlamp.

Ignition Transformer

Figure 10:
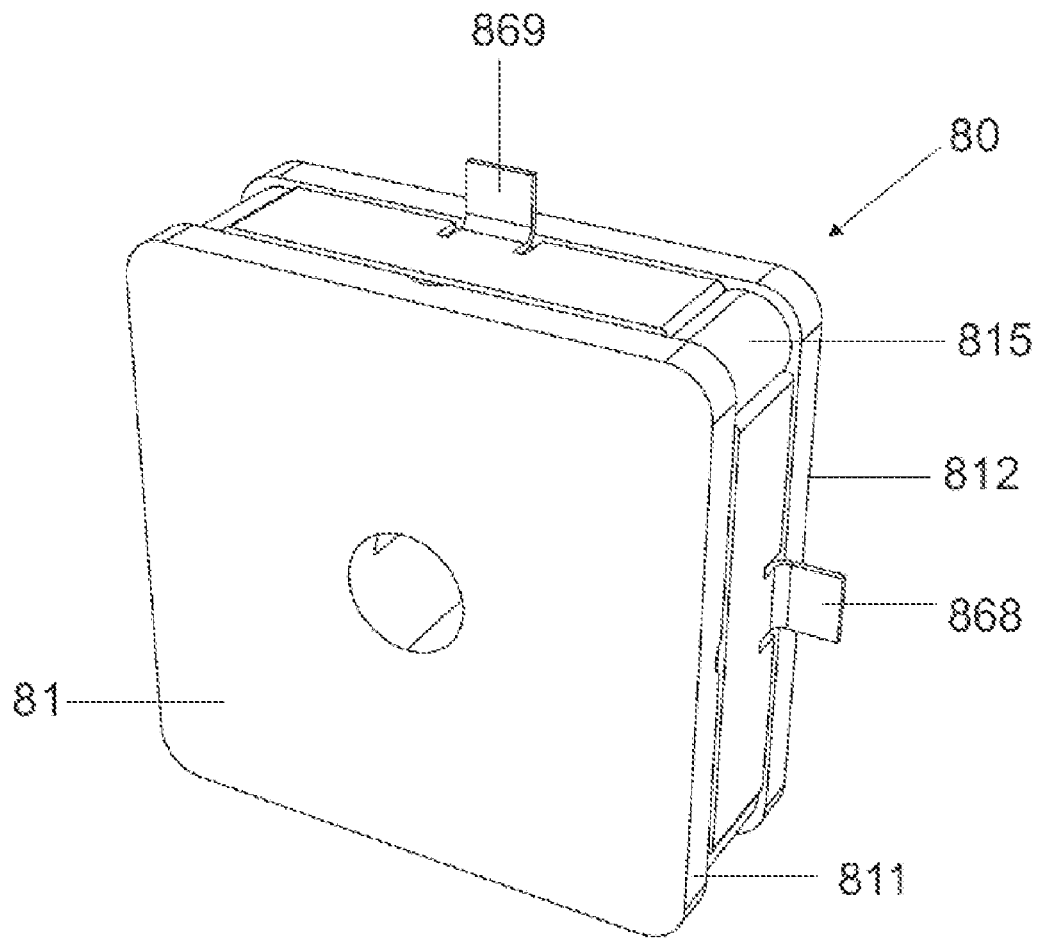
FIG. 10 shows a perspective view of an ignition transformer of the integrated gas discharge lamp.

In the following the design of the ignition transformer 80 of the integrated gas discharge lamp 5 will be explained. FIG. 10 shows a perspective view of the ignition transformer 80 in a first embodiment, in which the ignition transformer 80 has a quadrangular flat form. However, also other embodiments are possible, in which the ignition transformer 80 may have a round, hexagonal, octagonal or another appropriate form. Further embodiments will be described further below. In this respect, the term form means the form of the base area of the substantially prismatic outer dimensions of the ignition transformer, wherein the roundings at the body edges are neglected. In the particularly advantageous embodiment as shown, the prism has a small height, in particular a height which is smaller than $\frac{1}{3}$ of the diagonal or the diameter of the geometry forming the base area.

The ignition transformer 80 includes a ferrite core 81 which is composed of a first ferrite core half 811 and an identical second ferrite core half 812. The ignition transformer 80 includes several tongues 868, 869 on the sides, which serve the mechanical attachment of the ignition transformer 80.

Figure 11:
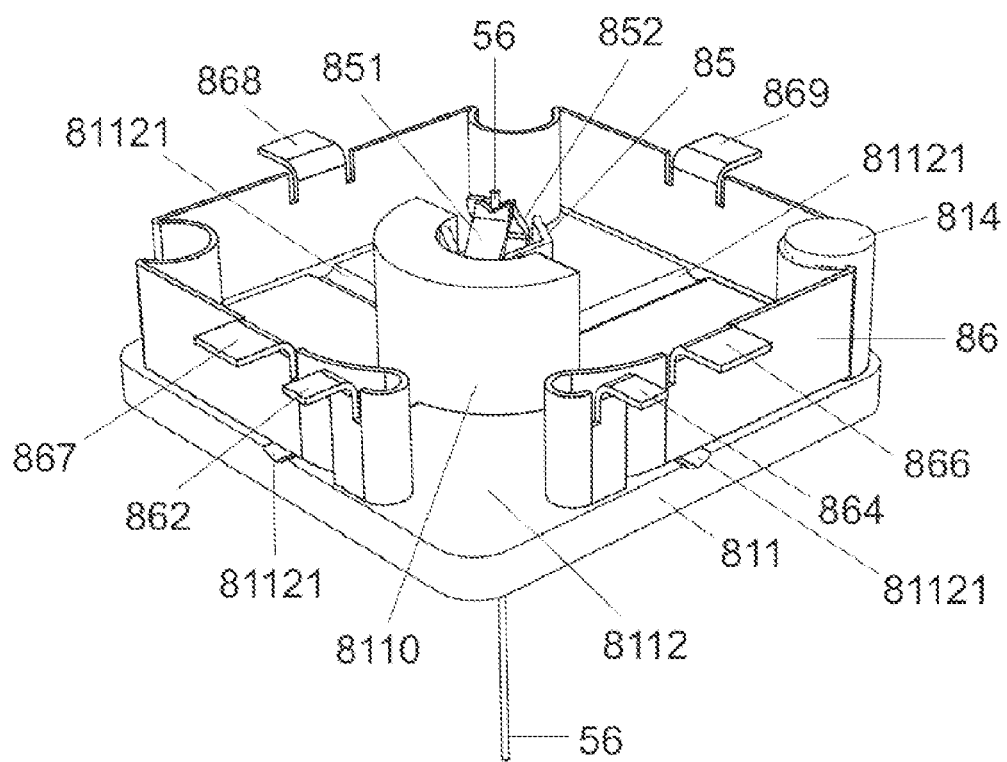
FIG. 11 shows a perspective view of the upper part of the ignition transformer.

FIG. 11 shows a perspective view of the upper part of the ignition transformer, in which the primary winding and the second ferrite core half 812 are not visible. The first ferrite core half 812 is built up of quadrangular side wall 8112, from which a half hollow cylinder 8110 centrally and inwardly protrudes. The inner side of the quadrangular side wall 8112 includes elongate recesses 81121 provided on the side facing the winding and extending from the outside towards the inside. By these recesses an impregnating varnish or a casting compound, into which the ignition transformer 80, after completion, is incorporated, can enter into the ignition transformer 80 from the outside towards the inside to thereby uniformly wet all turns of the ignition transformer 80.

Figure 12:
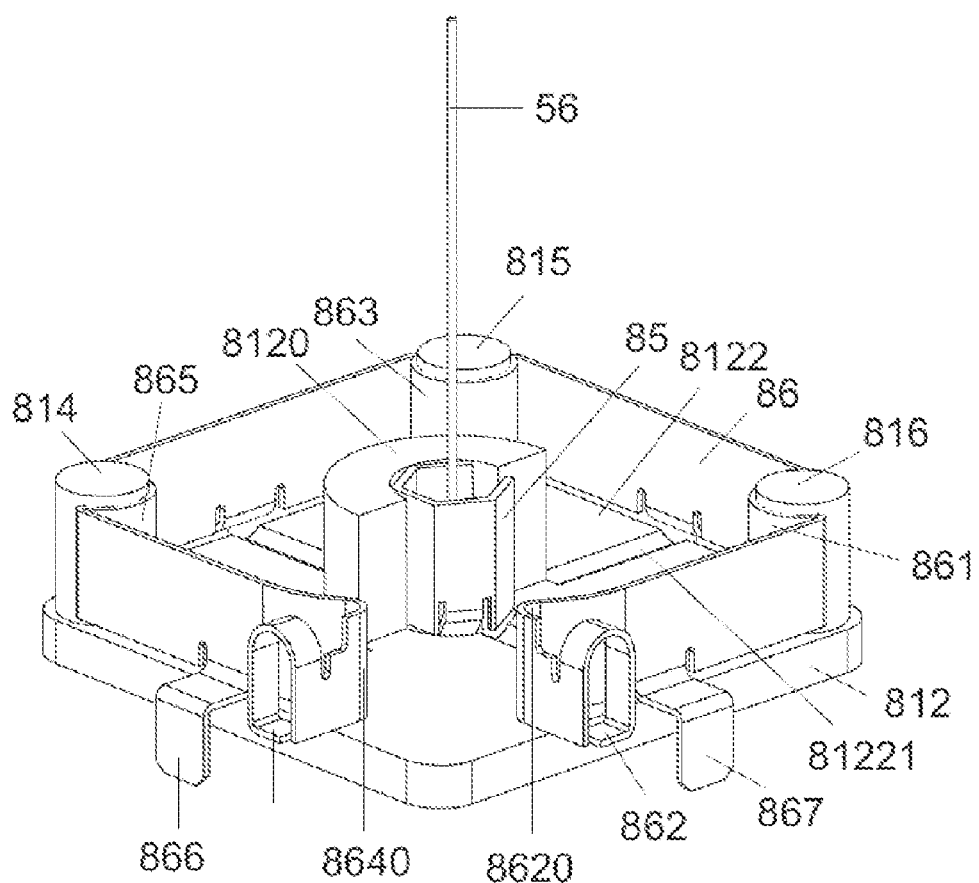
FIG. 12 shows a perspective view of the lower part of the ignition transformer.

A primary winding 86 is arranged on the outer edge between the two ferrite core halves 811, 812, which is comprised of a stamped bent part formed of sheet metal. The sheet metal is e.g. made of a nonferrous metal, such as copper, bronze or brass. In this respect, the sheet metal is e.g. elastically deformable and springy. The primary winding 86 is substantially a long ribbon which extends on the outside between the two ferrite core halves 811 and 812. In a first variant, the primary winding 86 extends around three corners of the ignition transformer 80 via only one turn, and the fourth corner is open. The sheet metal ribbon of the primary winding 86 includes the tongues 866, 867, 868 and 869 as mentioned above, which are attached in lateral direction of the sheet metal ribbon. The four tongues serve the mechanical attachment of the ignition transformer 80, wherein to this end they may, for example, be soldered onto a circuit board of the ignition electronics 910 as flat SMD-tongue or soldering tag. The lugs may, however, also have a further 90°-bent, wherein the lugs then are inserted through the printed circuit board and are clinched, twisted or soldered to, as shown in FIG. 12. The two ends of the sheet metal ribbon of the primary winding 86 are bent with a radius by approximately 180° towards the outside so that the ends again face away from the fourth corner. In FIG. 12, the two ends are bent towards the outside by approximately 90°, and the radii are indicated by 8602 and 8640, respectively. At the outer end of the sheet metal ribbon a laterally protruding lug 862, 864 is respectively attached, which serves the provision of electrical contact. In FIG. 12, an alternative embodiment of the two lugs 862, 864 is shown. By the smooth connection via the 180° radius of the two radii 8620 and 8640 tensions in the connection between the primary winding and the printed circuit boards, which may occur due to temperature changes, are complied with. The lugs will e.g. be soldered onto the printed circuit board of the ignition electronics 910 like an SMD-component. Due to the 180° bent of the sheet metal ribbon as described above, the soldering point will not be stressed by the described mechanical tensions, and the risk of fracture and fatigue of the soldering point is heavily reduced. The alternative embodiment of the lugs 862, 864 has a more extended 270° radius in the lug itself, which further reduces the mechanical tensions in the assembled condition.

A contact body 85 is incorporated into the center of the hollow cylindrical inner part of the ferrite core, which establishes the electrical contact between the gas discharge lamp burner 50 and the inner end of the secondary winding 87 (not shown). The contact body 85 consists of a bent sheet metal part which is connected to the current supply 56, which is proximal to the base, of the gas discharge lamp burner 50. The contact body 85 includes two roof surfaces on its end, which is distal from the burner, for contacting the high pressure discharge lamp electrode. By way of example, the contact body 85 includes two roof surfaces 851 and 852 on two facing sides of the end which is distal from the burner, which are inclined towards each other in a saddle-shaped manner and which, at the ends at which the two roof surfaces contact each other, are formed such that a current supply wire 56 of the high pressure gas discharge lamp burner 50 is centrally clamped. Hereunto, the two roof surfaces 851 and 852 are provided on its ends, at which the two roof surfaces 851, 852 contact each other, with a V-shaped contour. The contour, however, may also be round or formed in any other suitable manner. For assemblage, the current supply wire 56 is inserted through the contact body 85, cut to a predetermined excess length, and then welded to the contact body 85 e.g. by means of a laser.

FIG. 12 shows perspective view of the lower part of the ignition transformer. Among others, the figure shows the second ferrite core half 812 which is formed identically to the first ferrite core half 811. Also, it is built up of a quadrangular side wall 8122, from a half hollow cylinder 8120 protrudes centrally and inwardly. The inner side of the quadrangular side wall 8122 includes elongate recesses 81221 extending from the outside towards the inside. In the figure, the side, which is proximal to the burner, of the contact body 85 is apparent in its hexagonal open shape and with the current supply wire 56 running therethrough. If the two halves are mounted together, then a hollow cylinder is interiorly created, into which the contact body is incorporated. After the mounting, the ferrite core 81 has the shape of an audio tape or a film roll with the exception that the outer contour is not round, but us quadrangular with rounded corners.

At the first corner, the ignition transformer includes a first back iron ferrite 814. The second as well as the third corner is also provided with a second back iron ferrite 815 and a third back iron ferrite 816. The three back iron ferrites are retained by the primary winding 86. Hereunto, the sheet metal ribbon of the primary winding 86 has on the three ends cylinder shaped roundings 861, 863 and 865 facing inwardly, into which the back iron ferrites 814-816 are clamped. Due to the springy elastically deformable material, the three back iron ferrites 814-816 remain safely on their position during production. The back iron ferrites provide the magnetic back iron of the ignition transformer 80, by which the magnetic field lines are kept in the magnetic material so that they cannot cause interferences outside of the ignition transformer. This additionally increases the efficiency of the ignition transformer, in particular also substantially the amount of the achievable ignition voltage.

Figure 13:
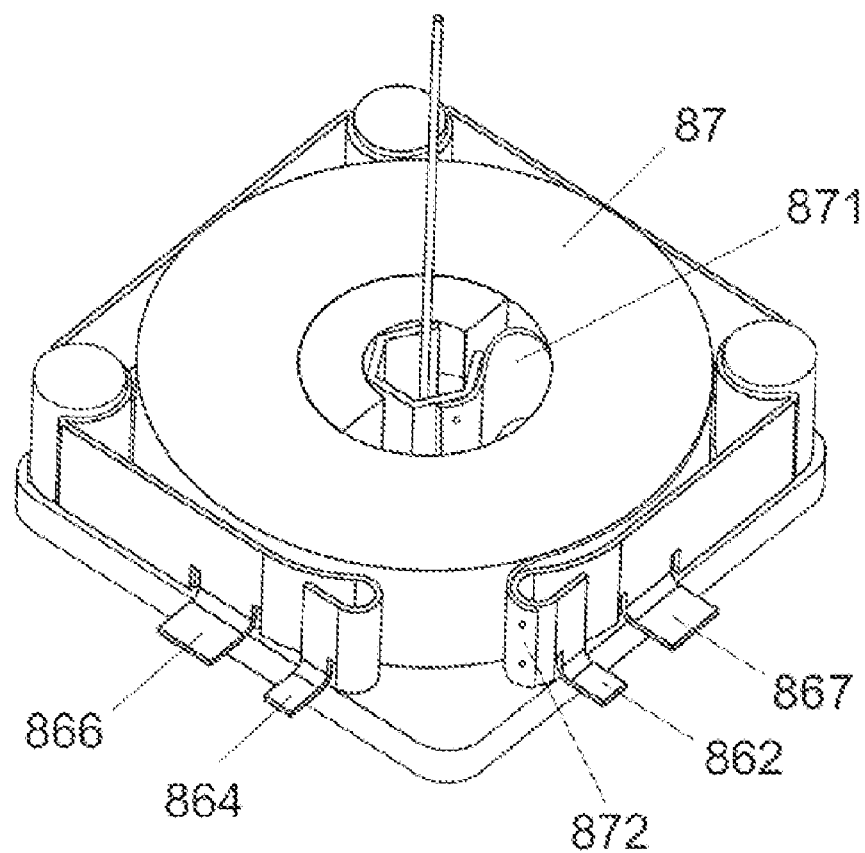
FIG. 13 shows a perspective view of the lower part of the ignition transformer with visible secondary winding.

FIG. 13 shows a perspective view of the lower part of the ignition transformer 80 having a visible secondary winding 87, how it is inserted into the second ferrite core half 812 of the ignition transformer 80. The secondary winding 87 consists of an isolated metal band, which is wound on the film cartridge spool shaped ferrite core with a predetermined winding number like a film, wherein the high-voltage carrying end is lying inside, is guided through the middle core of the film cartridge spool shaped ferrite core and is electrically conductively coupled to the contact body 85. The isolation may by applied on all sides onto the metal band, it may, however, also consist of an isolating film, which is wound together with the metal band. The isolating film is in this case e.g. broader than the metal band, in order to ensure a sufficient isolation distance. The metal film is in this case wound with the isolating film such that it lies in the middle of the isolating film. Thus, a spiralform gap is created, which is filled with the impregnating varnish, e.g. with the casting compound, after the impregnation, e.g. the casting, thereby causing an excellent isolation of the secondary winding 87.

At its inner high-voltage carrying end, the secondary winding 87 is coupled to the contact body 85. The outer low-voltage carrying end 872 of the secondary winding 87 is coupled to the primary winding 86. The bondings may be manufactured by means of soldering, welding, or another suitable coupling type. In the present embodiment, the bondings are laser welded. To do this, e.g. two weld spots are applied per end, which securely and electrically conductively couple the both parts together. The inner end of the secondary winding 87 in this case extends through the both hollow cylinder halves 8110, 8120 of the ferrite core 81, and is clamped by the same. The outer end 872 of the secondary winding 87 is in this case coupled to the end of the primary winding 86 such that the winding direction of the secondary winding 87 is opposite to the winding direction of the primary winding 86. Depending on the requirement, the outer end of the secondary winding 87 may, however, also be coupled to the other end of the primary winding 86 such that the winding direction of the primary and secondary windings is the same.

In the following, the diameter and the height of the ignition transformer 80, which is accommodated in the integrated gas discharge lamp 5, should be defined largely independent from its geometry and based on the dimensions of the ferrite core, in order to be able to make a simpler description. The height of the ignition transformer is understood to be the distance between the both respective winding-remote outer surfaces of the both sidewalls, which approximately correspond to the sum of the double thickness of a side wall and the winding width. The diameter of the ignition transformer 80 ignition transformer 80 in the following is understood to be the longest distance within one of the both sidewalls independent from the shape of the sidewalls, wherein the distance lies within any plane, wherein this plane runs parallel to the outer surface of the respective sidewall.

In a particularly advantageous embodiment, the ferrite core of the ignition transformer has a height of 8 mm and a diameter of 26 mm. In this case, the sidewalls have a diameter of 26 mm and a thickness of 2 mm and the middle core has a diameter of 11.5 mm at a height of 6 mm. The secondary winding consists of 42 windings of a Kapton film having a width of 5.5 mm and a thickness of 55 μm, onto which a 4 mm wide and 35 μm thick copper layer is applied, which copper layer in centered in the longitudinal direction. In another particularly advantageous embodiment, the secondary winding is wound by two separate films which are laid above one another, wherein a 75 μm thick copper film and a 50 μm thick Kapton film are used. In both embodiments, the secondary winding is electrically conductively coupled to the primary winding including one winding, wherein the primary winding is driven by an impulse generating unit having a 800 V spark gap.

Figure 14:
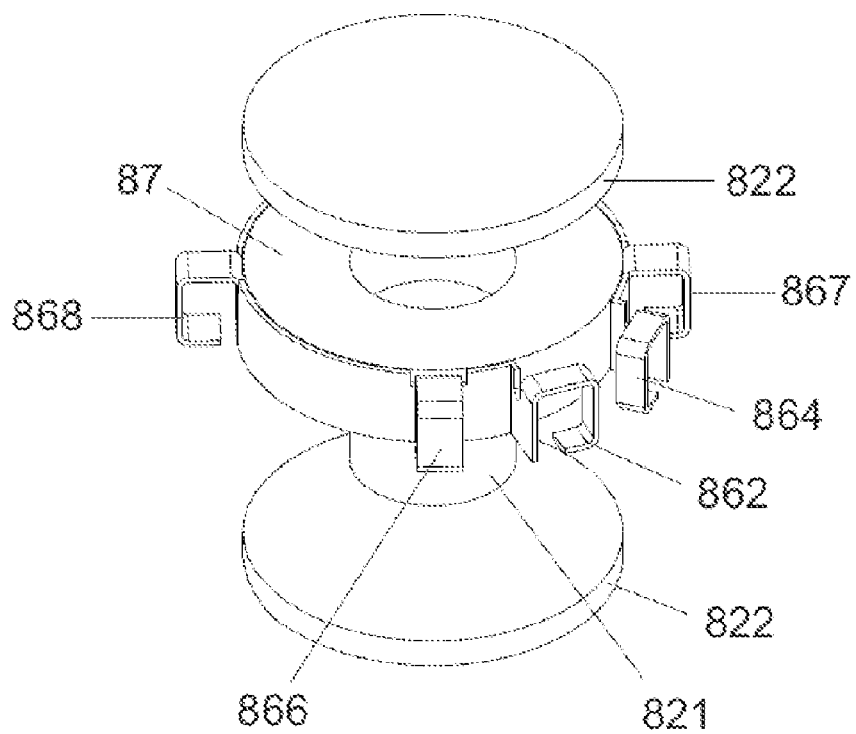
FIG. 14 shows an exploded view of the ignition transformer in a second round embodiment.

FIG. 14 shows an exploded view of the ignition transformer 80 in a second embodiment. Since the second embodiment is similar to the first embodiment of the ignition transformer 80, only the differences to the first embodiment will be described in the following. The ignition transformer 80 in the second embodiment has a round shape, similar to a film cartridge spool. Due to the round shape, the back iron ferrites 814-816 are omitted, and the primary winding 86 includes a simpler shape. The laterally distant clips for the mechanical fixing of the transformer are in this case implemented as SMD clips, which have a 270° bending to protect the solder joint from too high mechanical stress. The both clips 862, 864 for electrical connection are implemented in the same manner and are arranged radial at the circumference of the ignition transformer 80. The ferrite core 82 of the second embodiment is tripartly implemented, it includes a hollow cylinder shaped middle core 821, which is terminated at one of its both ends by round plates 822. The round plates 822 are lying centrically on the hollow cylinder 821 which results in the film cartridge spool shape described above. The hollow cylinder includes a slit 823 (not visible in the FIG.), in order to be able to guide the inner end of the secondary winding 87 into the inner of the hollow cylinder.

Figure 15:
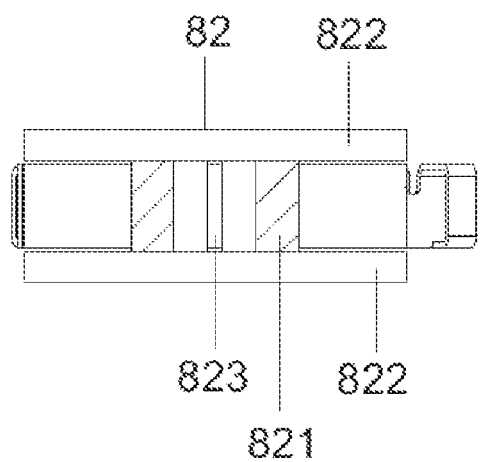
FIG. 15 shows a sectional view of the ignition transformer in a second round embodiment.

FIG. 15 shows a sectional view of the second embodiment of the ignition transformer 80. In this case the arrangement of the ferrite core 81 is good to be followed. In this view, also the slit 823 can be recognized, through which the inner end of the secondary winding 87 is guided through.

Figure 16:
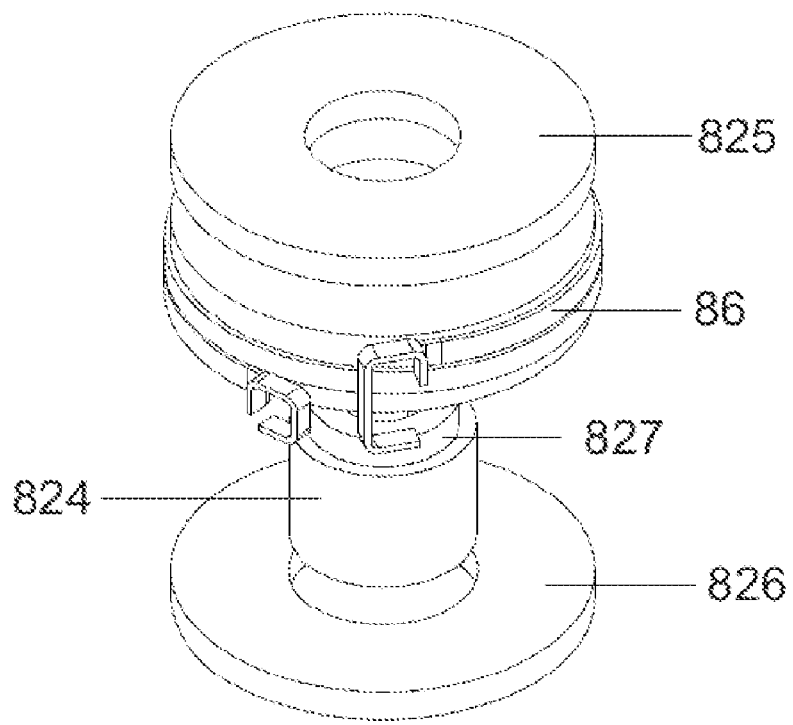
FIG. 16 shows an exploded view of the ignition transformer in a third round embodiment having a two-windings primary winding.

FIG. 16 shows an exploded view of the ignition transformer in a third round embodiment having a two-winding primary winding. Since the third embodiment is very similar to the second embodiment of the ignition transformer 80, only the differences to the second embodiment will be described in the following. In the third embodiment, the ignition transformer 80 includes one primary winding having two windings. The metal band of the primary winding 86 thus runs scarcely twice around the ignition transformer. At the both ends, again clips for the electrical contacting of the ignition transformer 80 are arranged, which are implemented as SMD variant. The clips for the mechanical fixing of the ignition transformer 80 are missing in this embodiment, hence, the ignition transformer 80 has to be fixed otherwise. This can e.g. be accomplished by an entrapment of the ignition transformer 80, as this is indicated in FIG. 3. The ignition transformer 80 is in this case clamped between the base 70 and the base plate 74. For this, the base plate 74 includes a base plate dome 741, an elevation on the base plate, which clamps the ignition transformer 80 in the built-in state. The advantage of this construction is the good de-heating of the ignition transformer 80. This can become very hot in operation, since it is arranged very near to the gas discharge lamp burner 50 of the integrated gas discharge lamp 5. Due to the thermally well conductive base plate 74, a portion of the heat, which is brought into the ignition transformer 80 by the gas discharge lamp burner 50, can be dissipated again and the ignition transformer 80 can effectively be cooled.

Figure 17:
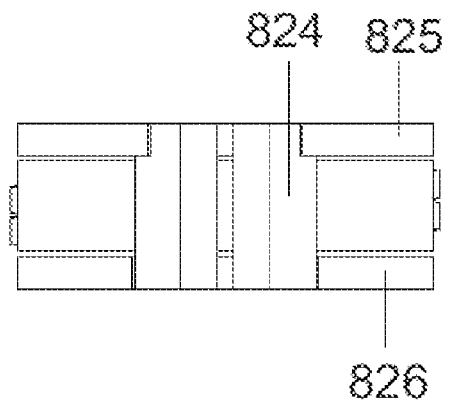
FIG. 17 shows a sectional view of the ignition transformer in a third round embodiment having a two-windings primary winding.

FIG. 17 shows a sectional view of the ignition transformer 80 in a third round embodiment with two-winding primary winding. This sectional view again shows the core arrangement of the ferrite core 82 very well. The ferrite core 82 is as in the second embodiment built from three parts, a middle core 824 and two plates 825, 826. The middle core 824 is also hollow cylindrical and includes at one end an offset 827, which engages into a round cutout of the first plate 825 and fixes the same on the middle core 824. A second plate 826 also includes a round cutout, the inner radius of which corresponds to the outer radius of the middle core 824. This plate is attached to the middle core after the mounting of the secondary and the primary windings and is thereby fixed. The plate is attached to such an extent until it lies on the secondary winding to achieve a magnetic flux in the ignition transformer 80 as good as possible.

Asymmetric Ignition Pulse

In the following, the operation of the ignition device of the integrated gas discharge lamp 5 will be explained.

Figure 18A:
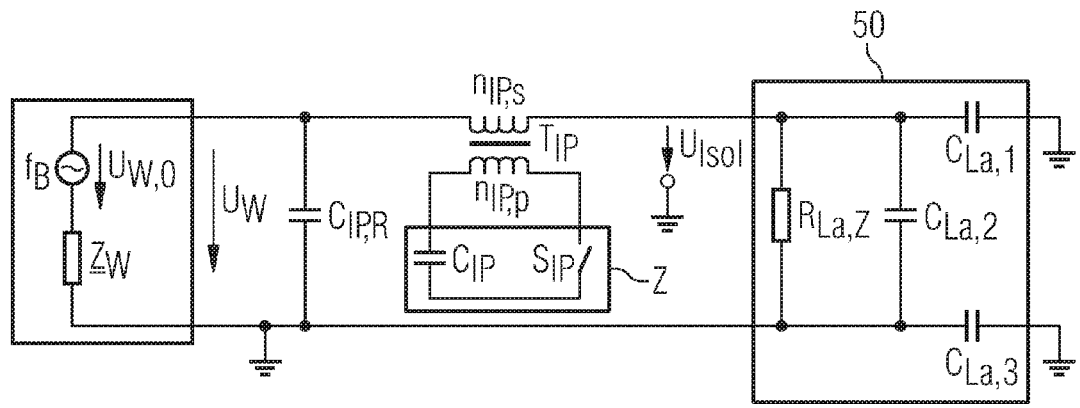
FIG. 18a shows a schematic circuit diagram of an asymmetric impulse ignition in accordance with the prior art.

FIG. 18a shows the schematic circuit of an asymmetric impulse ignition device according to the prior art. In the asymmetric impulse ignition device, the ignition transformer $T_{IP}$ is connected into one of the supply lines of the gas discharge lamp burner 50, which is in this case illustrated as equivalent circuit diagram. This causes an ignition pulse, which generates a voltage only in one "direction" from the ground reference potential, which is mostly connected to the other supply line of the gas discharge lamp burner; it is hence generated either a positive voltage pulse with reference to the ground reference potential or a negative voltage pulse with reference to the ground reference potential. The functionality of an asymmetric impulse ignition device is widely known and should not be described further herein. The asymmetric voltage is well suitable for one-sided capped lamps, since the ignition voltage is applied only to one of the both gas discharge lamp burner electrodes. To do this, regularly, the base near electrode is selected, since it cannot be touched and thus does not represent any potential danger for the human during an incorrect use. At the return conductor, which is usually openly routed, no voltage dangerous for the human is applied, hence, a lamp operated with an asymmetric ignition device ensures a certain security. The asymmetric ignition device, however, has the disadvantage of applying the entire ignition voltage to a gas discharge lamp electrode. Thus, the losses due to corona discharges and other effects caused by the high-voltage increase. This means that only a portion of the generated ignition voltage is actually applied to the gas discharge lamp burner 50. Thus, a higher ignition voltage has to be generated that would be necessary, which is elaborate and costly.

Figure 18B:
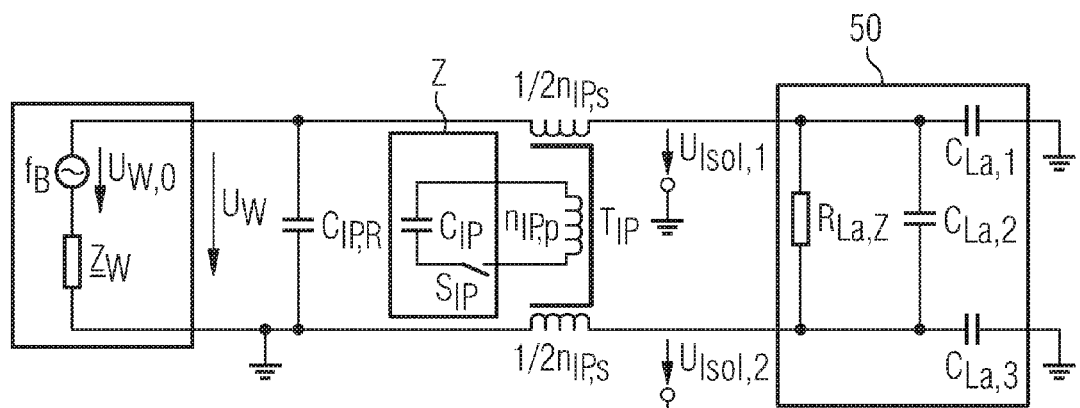
FIG. 18b shows a schematic circuit diagram of a symmetric impulse ignition device in accordance with the prior art.

FIG. 18*b* shows the schematic circuit of a symmetric impulse ignition device according to the prior art. The symmetric impulse ignition device includes an ignition transformer $T_{IP}$, which includes two secondary windings, which are magnetically coupled together with the primary winding. The both secondary windings are oriented such that the generated voltage of both secondary windings adds up at the lamp. Thus, the voltage is distributed approximately in halves to the both gas discharge lamp electrodes.

As already mentioned above, the losses due to corona discharges and other parasitic effects are thus reduced. The reason for the generally higher ignition voltage at the symmetric impulse ignition becomes evident only on closer inspection of the parasitic capacities. For this purpose, the lamp equivalent circuit diagram of the gas discharge lamp burner 50 in FIG. 18*b* will be observed. A large, if not even the largest portion of the parasitic lamp capacity $C_{LA}$ is not caused be the lamp itself, but by the connection between the lamp and the ignition unit, e.g. by the lamp conductor. However, these do not only have parasitic capacities of conductor to conductor, but also between conductor and environment. If one simplifyingly starts from a description with concentrated energy storages, the parasitic capacities between the both conductors or the both gas discharge lamp electrodes may be summarized to $C_{LA,2}$, as shown in FIG. 18*b*. The parasitic capacities present respectively between conductor and environment are modelled by $C_{LA,1}$ and $C_{LA,2}$, respectively. In the following, the potential of the environment, e.g. of the casing, is considered as spatially constant and is represented by the grounding symbol, even if this does not need to match with the PE or PEN in the sense of a low-voltage network. Furthermore, a symmetric construction and thus $C_{LA,1}=C_{LA,2}$ will be assumed. According to the extended equivalent circuit diagram, the parasitic lamp capacity results in $C_{LA,2}+\frac{1}{2}C_{LA,2}$.

The difference between the asymmetric impulse ignition and the symmetric impulse ignition becomes evident when considering that also the converter and the ignition unit have parasitic capacities with respect to the environment. These are partially increased for purpose (e.g. network filter) and are generally substantially larger than the parasitic capacities of the lamp with respect to the environment as considered above, and thus electronics on environment potential can be assumed in a simplifying manner for the consideration of the ignition. Disregarding the voltage UW, in the case of the asymmetric ignition, $C_{LA,1}$ and $C_{LA,2}$ are thus to be charged to the ignition voltage, whereas in the case of the symmetric ignition, $C_{LA,2}$ is to be charged to the ignition voltage and $C_{LA,1}$ and $C_{LA,3}$ are respectively to be charged to half of the ignition voltage. Assuming a symmetric construction, i.e. $C_{LA,1}=C_{LA,3}$, in the symmetric impulse ignition, less energy is thus required for the charging of the parasitic capacities than for the asymmetric variant. In the extreme case $C_{LA,1}=C_{LA,3}>>C_{LA,2}$, the ignition unit in accordance with FIG. 18*a*, has to provide approximately twice the energy compared with the ignition unit in accordance with FIG. 18*b*.

A further advantage of the symmetric ignition lies in the less required isolation strength with respect to the environment, since the occurring voltages $U_{Isol,1}$ and $U_{Isol,2}$ only have half the value compared with the voltage $U_{Isol}$ in the case of the asymmetric ignition. This also shows the disadvantage of the symmetric impulse ignition and the reason why it often cannot be used: In the case of the asymmetric ignition both lamp terminals carry high-voltage, which is often inadmissible for security reasons, since in many lamp or base constructions, one of the both lamp terminals, usually the lamp remote one, which is then referred to as "lamp return conductor", can be touched.

This shows that the symmetric ignition process is optimally suitable for two-sided capped gas discharge lamps, which already from the mechanical construction are configured to be symmetric. In a one-sided capped gas discharge lamp, there exists, as already previously mentioned, the problem of the ignition voltage, which is applied at the open base-remote gas discharge lamp electrode which can be reached by the user. A further problem is the voltage applied at the base-remote gas discharge lamp electrode with respect to the potential of the reflector. The reflector, into which the gas discharge lamp is built-in, is usually grounded. Thus, at the moment of ignition, a high voltage is applied between the return conductor of the base-remote electrode and the reflector. This may result in sparkovers on the reflector, which result in malfunction. For these reasons, a symmetric ignition is not suitable for one-sided capped gas discharge lamps.

Furthermore, it is to be noted that the isolation effort increases linearly with the voltage to be isolated. Due to non-linear effects in isolation substances, typically, with a doubling of the voltage, the distance between two conductors have to be more than doubled in order not to obtain a sparkover/electric breakdown.

In addition to the above considered pure capacitive behaviour of the environment and the involved isolation substances, respectively, beginning with a certain voltage or the resulting field strengths in the isolation substances and an its boundary surfaces, an active power realization in the isolation substances e.g. due to corona discharges, partial discharges, etc. may no longer be neglected. In the above equivalent circuit diagrams, additional non-linear resistors are to be added in parallel to the capacities. Also under this aspect, the symmetric impulse ignition is to be preferred to the asymmetric.

In conclusion, the observation is to be noted that beginning with a certain voltage stress of the isolation substance, the same is aging substantially faster and thus in the case of an insignificant voltage reduction a substantially increased lifetime can be assumed.

Figure 19:
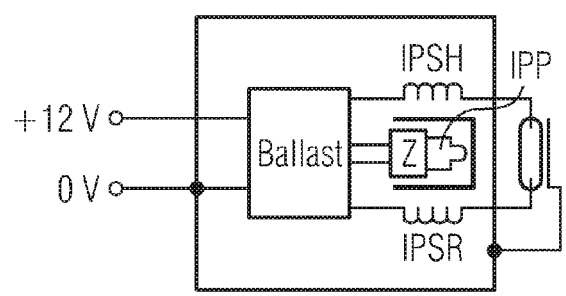
FIG. 19 shows a schematic circuit diagram of an asymmetric impulse ignition device.

A good compromise, which combines the advantages of both ignition processes in itself, represents the asymmetric impulse ignition, as can be seen in FIG. 19 in schematic representation. It has a similar construction as the symmetric ignition, however, the both secondary windings have differing winding numbers. The disadvantage of the symmetric ignition process is indeed above all that an inadvertent touching of the return conductor during the ignition and thus the touching of a high-voltage carrying metal part by the user cannot be eliminated. In the integrated gas discharge lamp 5, which includes the above described headlamp interface in accordance with FIG. 5, this can be eliminated, since the voltage supply of the electronics happens only with the insertion into the headlamp. Thus, it is impossible, with an intact headlamp, to touch the return conductor of the base-remote electrode, when it carries voltage. As already mentioned above, a symmetric ignition is also not possible in this case, since sparkovers to the usually grounded reflector have to be feared. Thus, an asymmetric ignition is proposed, which e.g. applies ¾ of the ignition voltage to the base-near electrode, and e.g. ¾ of the ignition voltage to the base-remote electrode. The exact voltage ratio between the electrodes of the gas discharge lamp burner 50, hence of the base-near first lamp electrode and the base-remote second lamp electrode in this case depends on many factors, the lamp size and the base construction. The voltage ratio between the base-near first lamp electrode and the base-remote second lamp electrode may in this case be in the range from 22:1 up to 5:4. Via the return conductor secondary winding IPSR of the ignition transformer $T_{IP}$, e.g. voltages are generated from 2.8 kV, and via the forward conductor secondary winding IPSH of the ignition transformer $T_{IP}$, e.g. voltages are generated from 23.17 kV. This may result in voltage conversion ratios between the both secondary windings unequal to 1, namely $n_{IPSR}:n_{IPSH}=2:23 \ldots 8:17$. This may also be expressed as equation $n_{IPSR}=0.04 \ldots 0.8*n_{IPSH}$. Hence, the construction is similar to the construction of a symmetric igniters, however, the secondary windings are not distributed equally.

The number of the primary windings $n_p$ of the ignition transformer $T_{IP}$ in this case e.g. is in the range from 1 to 4, the sum of the winding numbers of both secondary windings IPSH and IPSR is e.g. in the range from 40 to 380.

The impulse ignition unit Z in FIG. 19 is widely known from the prior art and will thus not not be described in more detail herein. It in this case consists of at least one capacitor, which is connected to the primary winding of the ignition transformer via a switching element. In this case, e.g. a switching element having a nominal triggering voltage between 350 V and 1300 V is used. This may be a switching spark gap or a thyristor having a corresponding driving circuit. In the present first embodiment, the ignition transformer $T_{IP}$ has a conversion ratio $n_{IPP}:n_{IPSR}:n_{IPSH}$ of 1:50:100 windings, which is operated by an ignition unit Z based on a 400 V spark gap, i.e. by a spark gap having a nominal triggering voltage of 400 V. The ignition transformer $T_{IP}$ provides a peak voltage of +5 kV towards ground at the base-remote electrode of the gas discharge lamp burner 50 and a peak voltage of −15 kV towards ground at the base-near electrode of the gas discharge lamp burner 50.

In a further second embodiment, the ignition transformer is implemented with a conversion ratio of 3:50:100 windings, and is operated by an ignition unit Z based on an 800 V spark gap. This provides a peak voltage of −8 kV towards ground at the base-remote electrode of the gas discharge lamp burner 50 and a peak voltage of +16 kV towards ground at the base-near electrode of the gas discharge lamp burner 50.

Figure 20:
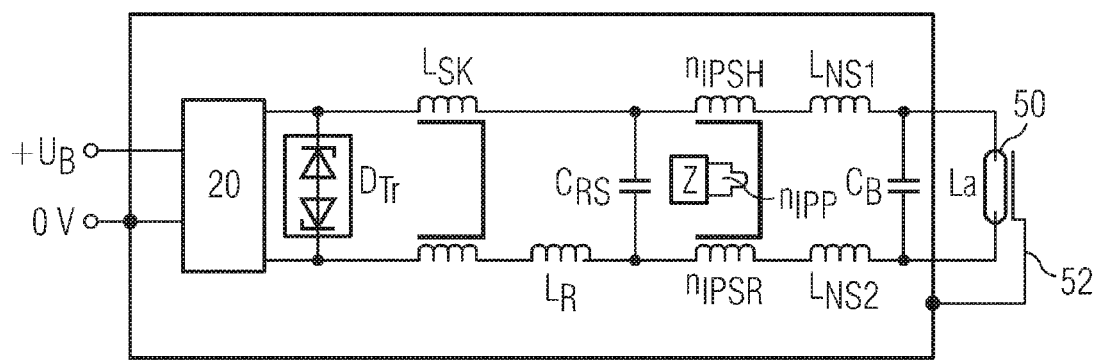
FIG. 20 shows a schematic circuit diagram of an extended circuit of the integrated gas discharge lamp.

FIG. 20 shows the schematic circuit diagram of an extended circuit of the integrated gas discharge lamp 5. Here, one or two non-satiable inductors $L_{SN1}$ and $L_{SN2}$ are respectively connected between the high-voltage carrying end of a respective one secondary winding and the respective burner terminal, in order to avoid disturbing pulses having high voltage peaks (so-called glitches). In this case, inductor values of from 0.5 µH to 25 µH, e.g. of from 1 µH to 8 µH are used. In addition to this, a high-voltage strong capacitor $C_B$ (a so-called "burner capacitor") may be directly coupled in parallel to the gas discharge lamp burner and thus between the gas discharge lamp burner and the non-satiable inductors. This high-voltage strong capacitor $C_B$ usually has a capacity of smaller than 22 pF in order not to dampen the ignition pulse too strongly. By way of example, it has a capacity between 3 pF and 15 pF. The capacitor may constructively implemented by means of a corresponding arrangement and configuration of the injection moulded lamp current supply e.g. in the form of plates. The capacitor has two positive impacts: on the one hand, it is of advantage for the electromagnet compatibility behaviour of the lamp, since high-frequency disturbances being generated by the lamp are short-circuited directly at the location of its generation, on the other hand, it ensures a low-ohmic breakdown of the burner, which in particular alleviates a taking over by means of the operation circuit 20.

By means of the back iron capacitor $C_{RS}$, having a capacity value e.g. being between 68 pF and 22 nF, a termination of the impulse igniter with respect to the electronic ballast is achieved for the very fast pulses generated by the impulse transformer $T_{IP}$, which termination has a very low impedance. Due to this, the generated high voltage ignition pulse is applied in a very good approximation completely at the burner. The back iron capacitor $C_{RS}$ together with the return conductor inductor $L_R$ forms a low-pass filter. This counteracts electromagnetic disturbances and protects the electromagnetic compatibility output from inadmissably high voltages. The extended circuit also includes a current compensated inductor $L_{SK}$, which also counteracts electromagnetic disturbances. A suppression diode $D_{Tr}$, also referred to as clamping diode, limits the voltage generated due to the ignition process at the operation circuit 20 and thus protects the output of the operation circuit 20.

Figure 21:
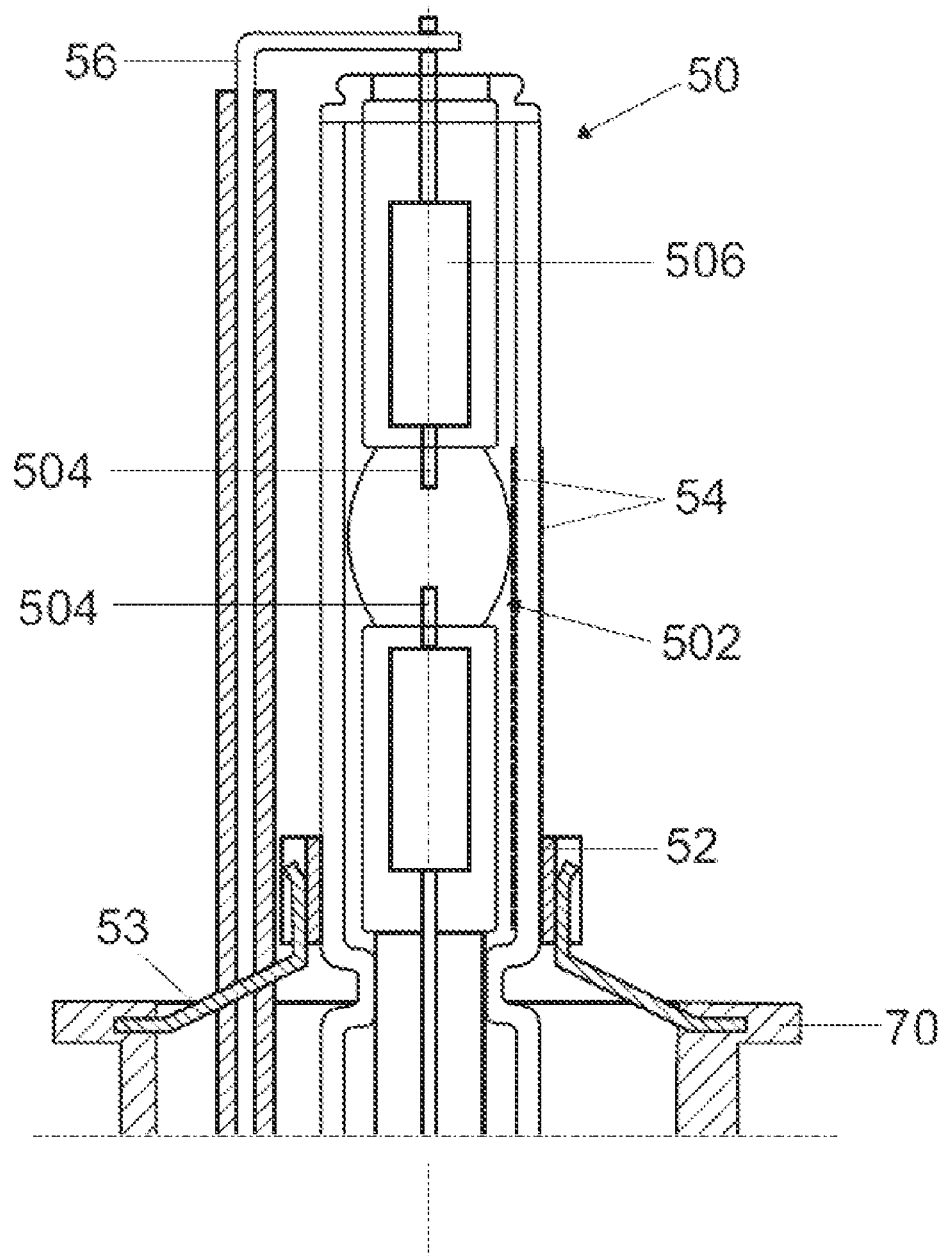
FIG. 21 shows a sectional view of the gas discharge lamp burner of the integrated gas discharge lamp including the base construction.

The gas discharge lamp burner 50 of the integrated gas discharge lamp 5 is fixed to the base 70 by means of a metal clamp 52 and four retaining sheets 53 (see e.g. FIG. 1). As already indicated in FIG. 20, this metal clamp 52 will now be grounded, i.e. at a gas discharge lamp for automobiles e.g. put on the auto body ground. Due to the grounding of the metal clamp, a sparkover from the metal clamp to the headlamp is securely prevented, since both parts are on the same potential also during the ignition. Furthermore, a particularly good capacitive coupling to an ignition auxiliary coating being present on the gas discharge lamp burner vessel is established by the grounding of the metal clamp. Such ignition auxiliary coatings are often deposited at high-pressure discharge lamp burners in order to reduce the high ignition voltages. This measure increases the ignition voltage reducing characteristic of the ignition auxiliary coating being present on the gas discharge lamp burner vessel. It is particularly advantageous if the capacitive influence of the metal clamp on the gas discharge lamp burner (if applicable including its ignition auxiliary coating) is increased. To do this, further electrically conductive parts are coupled to the metal clamp galvanically or capacitively. This results in a type of "third electrode", which consists of a plurality of "individual electrodes coupled with each other" and which is grounded on one side. By way of example, this third electrode may include a metallic coating 54 on the outer bulb in addition to the metal clamp, as this is indicated in FIG. 21. The coating may in this case be deposited on the outer side and/or the inner side of the outer bulb. The coating consists of electrically conductive, e.g. metallic, material and is e.g. applied in a strip parallel to the return conductor. Due to this, the metallic coating 54 does not appear and, in addition to this, it results in a minimum distance and thus in a maximum coupled capacity to the ignition auxiliary coating on the burner vessel. The coating on the outer bulb may be coupled to the metal clamp capacitively or galvanically. For a galvanic coupling it is particularly advantageous if the electrical contacting of the outer coating with the metal clamp is effected by the fixing of the burner in the metal clamp, which can be realized by means of an established mounting technique in accordance with the prior art without additional efforts. The coating may extend over 1% to 20% of the outer bulb circumference.

The positive effect of the grounded metal clamp on the ignition voltage of a gas discharge lamp results from the following physical coherence: Due to the fact that in a grounded metal clamp and an asymmetric impulse ignition a high voltage is applied between the metal clamp and both gas discharge lamp electrodes, a dielectric barrier discharge in the outer bulb is promoted. The dielectric barrier discharge in the outer bulb promotes a sparkover in the burner vessel. This is promoted by the UV light, which is generated at the dielectric barrier discharge and which is barely absorbed by the burner vessel, and which promotes the generation of free charge carriers at the electrodes and in the discharge chamber and thus reduces the ignition voltage.

The metal clamp and the reference plane to the reflector of the integrated gas discharge lamp 5 may consist of a metal part, which has corresponding anchors, which are coated by plastic, and which ensure a good mechanical coupling to the base 70. The grounding of the metal clamp then happens automatically by inserting the lamp into the reflector or the headlamp, respectively. This now makes the reference plane more robust with respect to mechanical abrasion, which is advantageous due to the increased weight of an integrated gas discharge lamp 5. The configuration according to the prior art only provides for a plastic injection moulded part as reference plane.

In an embodiment of the integrated gas discharge lamp 5, the base consists of two parts. A first part having an already aligned gas discharge lamp burner 50, which is embedded into a base made of plastic by means of the metal clamp 52 and the retaining sheets 53, which base includes, as described above, includes a metal strengthened reference plane. This first part is coupled with a second part, which contains the ignition and operation electronics. The couplings for the lamp and the current supplies may be provided by means of welding, soldering, or by means of a mechanical coupling such as a plug contact or an insulation displacement termination contact.

FIG. 21 shows a gas discharge lamp burner 50, which will be described in the following. The gas discharge lamp burner 50 is e.g. a mercury-free gas discharge lamp burner, however, also a mercury-containing gas discharge lamp burner may be used. The gas discharge lamp burner 50 accommodates a gas-proof closed discharge vessel 502, in which electrodes 504 and an ionizable filling for generating a gas discharge are enclosed, wherein the ionizable filling is e.g. implemented as mercury-free filling, which includes xenon and halogenides of the metals sodium, scandium, zinc, and indium, and the weight proportion of the halogenides of zinc and indium is in the range from 20 to 100, e.g. at 50, and wherein the cold fill pressure of the xenon gas is in the range from 1.3 megapascal. It has been exhibited that this resulted in the decrease of the luminous flux with its operation period of the gas discharge lamp burner 50 and the increase of the burner voltage of the gas discharge lamp burner 50 with its operation period may be reduced. This means that the gas discharge lamp burner 50 has an improved luminous flux maintenance compared with the a gas discharge lamp burner in accordance with the prior art and shows a longer lifetime due to the reduced burner voltage increase over the operation period. Besides, the gas discharge lamp burner 50 shows only a slight shift of the chromaticity coordinate of the light emitted by the same over its operation period. In particular, the chromaticity coordinate only moves within the limits allowed in accordance with the ECE Rule 99. The comparably high cold fill pressure of the xenon as well as the comparably high weight proportion of the halogenides of the zinc substantially contribute to the setting of the burner voltage of the gas discharge lamp burner 50, i.e. the voltage, which appears after the completion of the ignition phase, in the quasi-stationary operation state over the discharge distance of the gas discharge lamp burner 50. The halogenides of the indium are present in such a small weight proportion that they indeed contribute to the setting of the chromaticity coordinate of the light emitted by the gas discharge lamp burner, but they do not provide a nameworthy contribution for the setting of the burner voltage of the gas discharge lamp burner 50. The halogenides of the indium, as well as the halogenides of sodium and scandium, mainly serve for the light emission with the gas discharge lamp burner 50.

Advantageously, the weight proportion of the halogenides of zinc is in the range from 0.88 micrograms to 2.67 micrograms per 1 $mm^3$ discharge vessel volume and the weight proportion of the halogenides of indium is in the range from 0.026 micrograms to 0.089 micrograms per 1 $mm^3$ discharge vessel volume. Iodides, bromides, or chlorides may be used as halogenides.

The weight proportion of the halogenides of sodium is advantageously in the range from 6.6 micrograms to 13.3 micrograms per 1 $mm^3$ of the discharge vessel volume and the weight proportion of the halogenides of scandium is in the range from 4.4 micrograms to 11.1 micrograms per 1 $mm^3$ of the discharge vessel volume in order to ensure that the gas discharge lamp burner 50 generates white light having a color temperature of about 4000 Kelvin and the chromaticity coordinate remains in the range of the white light, e.g. in narrow confines, during the lifetime period of the gas discharge lamp burner 50. At a small weight proportion the losses of sodium (caused by diffusion through the vessel wall of the discharge vessel) and scandium (caused by chemical reaction with the quartz glass of the discharge vessel) can no longer be compensated for and at a higher weight proportion the chromaticity coordinate and the color temperature are modified.

The volume of the discharge vessel advantageously is smaller than 23 $mm^3$ to come the ideal of point light source as close as possible. For the use as light source in a headlamp or another optical system, the light emitting portion of the discharge vessel 502, i.e. the discharge chamber including the electrodes enclosed therein, should have as small dimensions as possible. Ideally the light source should be point-shaped, in order to be able to arrange it in the focus of an optical imaging system. The high-pressure discharge lamp 5 according to the invention comes closer to this ideal than a high-pressure discharge lamp in accordance with the prior art, since it e.g. includes a discharge vessel 502 having a smaller volume. The volume of the discharge vessel 502 of the high-pressure discharge lamp 5 is in this case advantageously in the range from equal to or higher than 10 $mm^3$ to smaller than 26 $mm^3$ The distance between the electrodes 504 of the gas discharge lamp burner is e.g. smaller than 5 millimeters to come to the ideal of a point light source as close as possible. For the use as light source in a vehicle headlamp, the electrode distance e.g. is 3.5 millimeter. The gas discharge lamp burner 50 is optimally adjusted to the imaging conditions in the vehicle headlamp thereby.

The thickness and the diameter, respectively, of the electrodes 502 of the gas discharge lamp burner is advantageously in the range from 0.20 millimeter to 0.36 millimeter. Electrodes having a thickness in this value range may still be embedded in the quartz glass of the discharge vessel with a sufficient security and at the same time have a sufficient current carrying capability, which is particularly important during the so-called start-up phase of the high-pressure discharge lamp, during which it is operated with the threefold to fivefold of its nominal power and its nominal current. In the case of thinner electrodes a sufficient current carrying capability would no longer be ensured in the present embodiment having a mercury-free filling and in the case of thicker electrodes 504 there would be the risk of crack formation in the discharge vessel, caused by the occurring of mechanical stress due to the manifestly different thermal expansion coefficients of the discharge vessel material, which is quartz glass, and the electrode material, which is tungsten or tungsten doped with thorium or thorium oxide.

The electrodes are respectively coupled with a molybdenum film 506 embedded in the material of the discharge vessel, which allow a gas-tight current feedthrough, and the minimum distance of the respective molybdenum film 506 to the end, which projects into the inner space of the discharge vessel 502, of the electrode coupled with the same is advantageously at least 4.5 mm in order to ensure an as large as possible distance between the respective molybdenum film 506 gas discharge applied at the electrode tip projecting into the discharge vessel 502. The comparably large minimum distance between the molybdenum films 506 and the gas discharge caused by this has the advantage that the molybdenum films 506 are exposed to a smaller thermal stress and a smaller corrosion risk due to the halogenes in the halogene compounds of the ionizable filling.

Frequency Adjustment

In the following, a method for avoiding flicker or jitter phenomena will be described, which the operation electronics of the integrated gas discharge lamp 5 carries out.

The gas discharge lamps considered herein have to be operated with alternating current, which is primarily generated by the operation electronics 920. This alternating current may be a high-frequency alternating current, in particular having a frequency above the acoustic resonances occurring in gas discharge lamps, which corresponds to a frequency of the lamp current of about 1 MHz at the lamps considered herein. Usually, however, the low-frequency square-wave operation is used, which will be described in the following.

Gas discharge lamps, in particular high-pressure gas discharge lamps in principle tend, in a wrong operation, to breaks of the electric arc at the direction change of the lamp current, the so-called commutation, which is traced back to a low temperature of the electrodes. Usually, high-pressure gas discharge lamps are operated using low-frequency square-wave current, which is also referred to as "wagging direct current operation". In this case a substantially rectangular current having a frequency of usually 100 Hz up to several kHz is applied to the lamp. At each switching between positive and negative driving voltage, which is provided substantially by the operation electronics, the lamp current commutates, which results in the lamp current becoming zero for a short period of time. This operation ensures that the electrodes of the lamp are stressed equally despite a quasi-direct current operation.

The arc onset, that is the onset of the electric arc on the electrode, is in principle problematic during the operation of a gas discharge lamp with alternating current. During the operation with alternating current, during the commutation, the cathode becomes the anode and vice versa an anode becomes the cathode. The transition cathode-anode is by principle relatively unproblematic, since the temperature of the electrode has approximately no impact on its anodic operation. At the transition anode-cathode the capability of the electrode to be able to provide a sufficiently high current depends on its temperature. In case it is too low, the electric arc changes during the commutation, mostly after the zero-crossing, from a point-shaped electric arc onset operation mode in a diffuse electric arc onset operation mode. This change comes along with an often visible fall-off of the light emission, which can be observed as jitter.

Reasonably, the lamp is thus operated in point-shaped electric arc onset operation mode, since the electric arc onset in this case is very small and thus very hot. This has the consequence that due to the higher temperature at the small onset point less voltage is required here to be able to provide sufficient current.

In the following, the process is considered as commutation, in which the polarity of the driving voltage of the gas discharge lamp burner 50 changes, and in which therefore a large change in current or voltage appears. In a substantially symmetric operation mode of the lamp, the voltage or current zero-crossing is at the middle of the commutation time. In this case, it should be noted that the voltage commutation usually always proceeds faster than the current commutation.

From "The boundary layers of ac-arcs at HID-electrodes: phase resolved electrical measurements and optical observations", O. Langenscheidt et al., J. Phys D 40 (2007), pp. 415-431, it is known that with a cold electrode and diffuse arc onset, the voltage initially increases after the commutation, since the too cold electrode can only provide the required current by a higher voltage. In case the device cannot provide this voltage for the operation of the gas discharge lamp, the above mentioned jitter occurs.

The problem of the changing arc onset mode relates primarily to gas discharge lamps, which have rather large electrodes compared with similar lamps of the same nominal power. Typically, lamps are operated with overload, when "immediate light" is required, such as e.g. in xenon discharge lamps in the vehicle field, in which due to the legal regulations 80% of the light output has to be achieved after 4 seconds. These lamps are operated with a substantially higher power than its nominal power during a so-called "quick start", also referred to as start-up phase, to satisfy the effective automobile norms or regulations. Thus, the electrode is dimensioned to the high starting power, but is too large with respect to the normal operation state. Since now the electrode is mainly heated by the lamp current flowing through the same, the problem of the jittering mainly occurs at aged gas discharge lamps, the burner voltage of which is increased at the end of their lifetime. Due to the increased burner voltage, there is flowing a smaller lamp current, since the operation electronics remains the lamp power constant during the stationary lamp operation by means of regulation, which has the consequence that the electrodes of the gas discharge lamp can no longer be sufficiently heated at the end of the lifetime.

In an integrated gas discharge lamp one advantage now lies in the fact that the operation electronics is unreleasably coupled to the gas discharge lamp burner, so that the previous burning time, also referred to as accumulated burning time $t_k$, which is the result of the summation of all time periods in which the gas discharge lamp burner has been operated, regardless of the time periods lying therebetween, in which the gas discharge lamp burner has not been operated, can be detected by the operation electronics in a simple manner. This detection may e.g. be effected by means of a time measuring device having a non-volatile memory, which always measures the time when the gas discharge lamp burner 50 is operated, consequently an electric arc is burning between the electrodes. Since the problem of the jittering mainly occurs at older lamps, a method is proposed now, in which the operation frequency, with which the gas discharge lamp burner is operated, is adapted to the burning period of the gas discharge lamp burner such that with increasing burning period also the operation frequency is increased. This offers the following advantages: The change from anodic and cathodic operation phase, which comes along with a temperature modulation of the electrode spikes, occurs faster at a higher frequency. Consequently, at a higher frequency, the temperature hub of the electrode spikes is smaller due to its thermal inertia. Surprisingly, it turned out that at an electrode temperature, which is above a "critical minimum temperature" of the lamp electrodes, a jitter does not happen.

The frequency, however, must not be arbitrarily increased, since, otherwise, it may result in an excitation of acoustic resonances in the lamp, which may come along with deformation of the arc as well as also with jitter. This effect is possible already beginning with frequencies of 1 kHz, for which reason, usually a frequency of 400 Hz or 500 Hz is selected for the normal operation, i.e. after the ignition and start-up phase in the stationary operation phase. This frequency will also be referred to as the lower limit frequency in the following. In the following, the expression "low accumulated burning time" is considered to be a burning time, in which the burner 50 of the gas discharge lamp 5 does not yet show or only shows little aging effects. This is the case until the accumulated burning time reaches approximately the first 10% of the specified lifetime of the gas discharge lamp 5. The expression "near the specified lifetime" will in the following be considered as a lifetime, in which the accumulated burning time slowly reaches the specified lifetime, e.g. is between 90% and 100% of the specified lifetime. The lifetime specified by the manufacturer will be considered as the specified lifetime.

Figure 22:
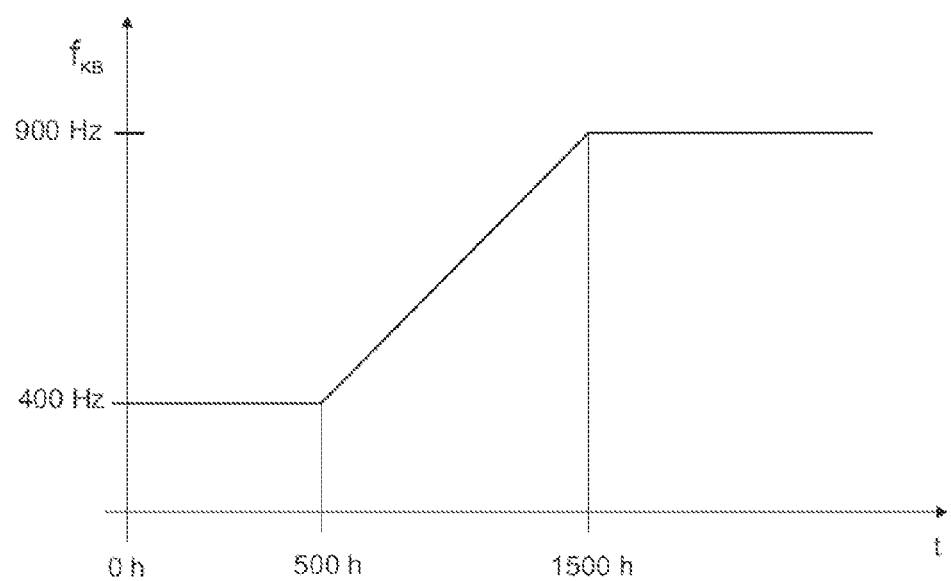
FIG. 22 shows a diagram of the operation frequency of the gas discharge lamp burner over its burning time.

FIG. 22 shows the diagram of a first embodiment of the method, in which the operation frequency of the gas discharge lamp burner is plotted over its burning time. It is well to be recognized that the operation frequency remains constant at 400 Hz for up to a burning time of 500 h, then it is successively increased by 0.5 Hz/h up to 900 Hz during the burning time of 500 h to 1500 h, to then remain at 900 Hz from then on.

Figure 32:
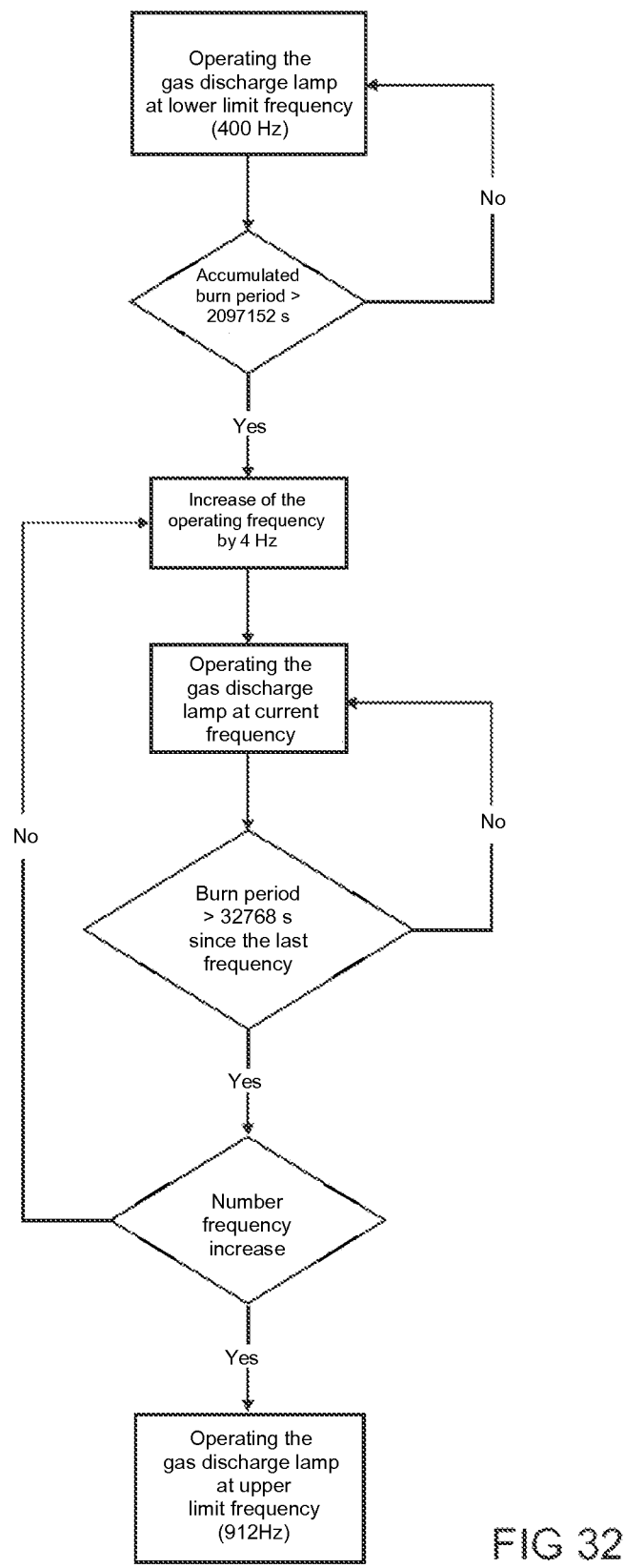
FIG. 32 shows a flow diagram of a variant of a first embodiment of a method for operating an integrated gas discharge lamp.

The frequency increase in the range 500 h to 1500 h, however, does not need to occur in a continuous manner, but may also occur in steps. Thus, in a second variant of the first embodiment of the method, which is illustrated in FIG. 32, the frequency is increased by 4 Hz always after the expiration of 32768 s, which corresponds to to approximately 9.1 h, beginning with an accumulated burning time of 2097152 s, which approximately corresponds to 583 h. The frequency is increased until 128 increases have been carried out. Then, the frequency has—starting from the initial starting value of 400 Hz—reached the value of 912 Hz. The second variant of the first embodiment of the method is particularly suitable for the realization by means of digital logic, e.g. by means of a microcontroller oder a digital circuit in an ASIC, since it only requires discrete time and frequency steps.

Figure 33:
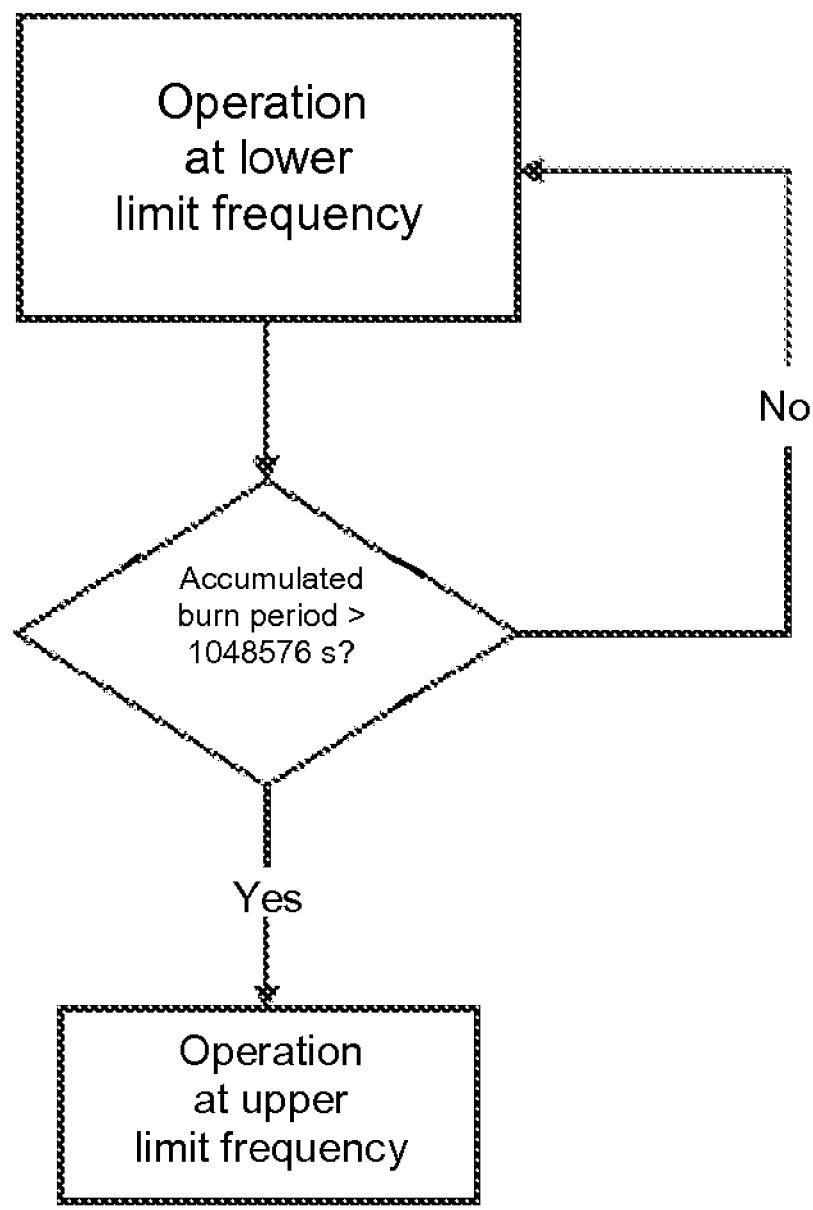
FIG. 33 shows a flow diagram of a further variant of the first embodiment of the method for operating an integrated gas discharge lamp.

In the third variant of the first embodiment, which is illustrated in FIG. 33, a particularly simple realization is used. In this case, after a time of 1048576 s, which corresponds to approximately 291 h has expired, the frequency is doubled from 300 Hz to 800 Hz in one step. Subsequently, the lamp is always operated using the high frequency. In contrast to the second variant of the first embodiment, however, only one single frequency step occurs.

Figure 34:
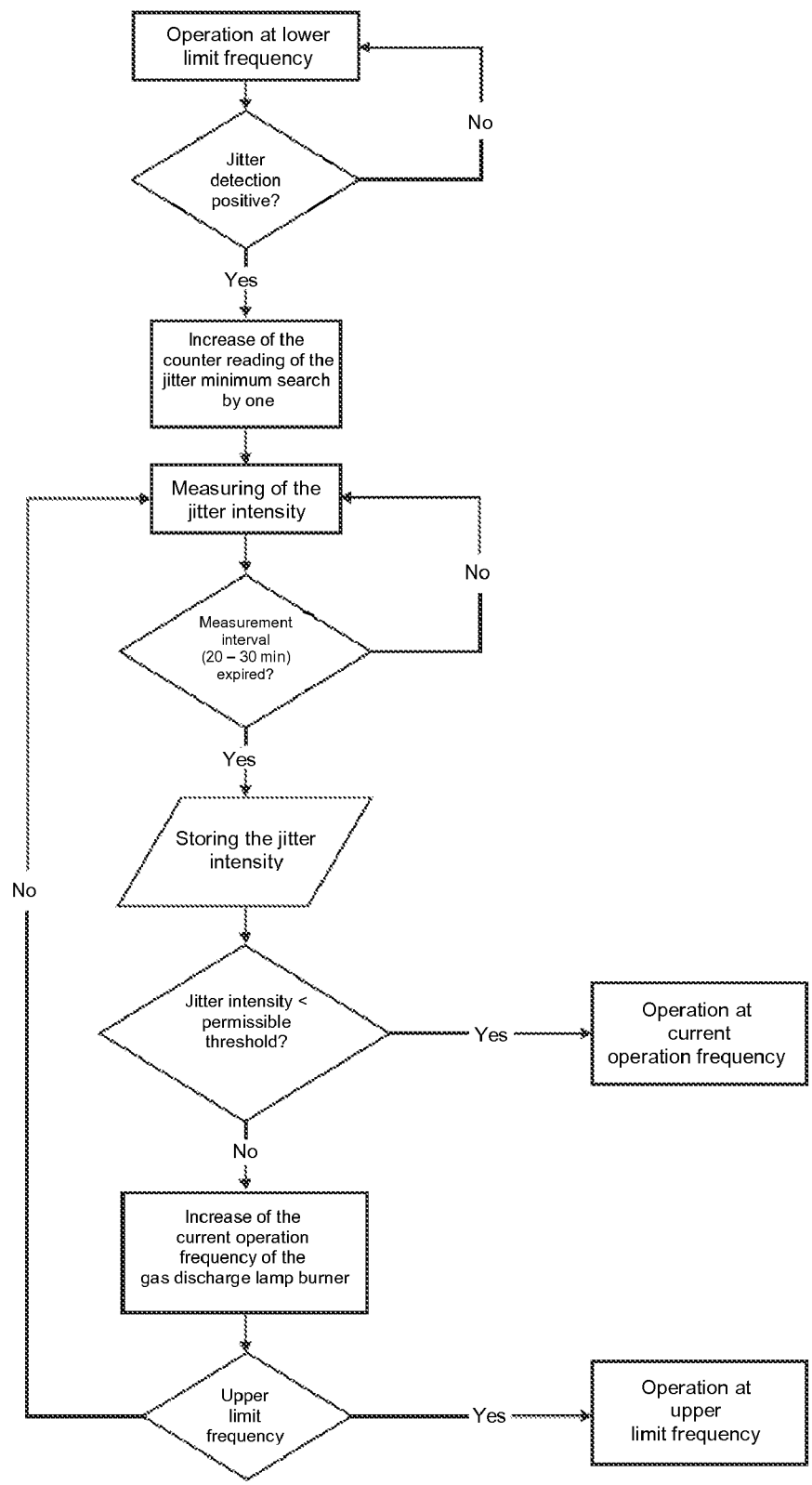
FIG. 34 shows a flow diagram of a second embodiment of a method for operating an integrated gas discharge lamp.

In a second embodiment, which is illustrated in FIG. 34, the above method is combined with a circuit arrangement for detecting jitter (not shown), in order to be able to carry out an adaptation of the frequency according to the need to the requirements of the lamp burner. The circuit arrangement for detecting jitter is in this case based on a detection circuit, which uses the lamp voltage and/or the lamp current for the detection. As an alternative, also suitably correlating parameters ahead of the alternating current converter may be used for the detection. An electronic operation device or ballast as it is usually used in the vehicle and which can be contained in the integrated gas discharge lamp 5 as operation electronics 920, has a two-stage construction consisting of direct current converter and alternating current converter, which are coupled with each other via an intermediate direct current link, wherein the change of the voltage of the intermediate direct current link over time and/or the change over time of the current flowing from the intermediate direct current link into the alternating current converter may be considered as measure for the jitter of the lamp.

The circuit arrangement for detecting the jitter now detects as to whether a jitter occurs in the lamp. If this is the case, and if the previous burning time of the lamp is higher than 500 h, then a jitter mapping process is started.

The process includes the following steps:
Increasing the counter reading of a jitter minimum search by one
Step-wise increase of the operation frequency of the gas discharge lamp burner starting from the lower limit frequency,
Measuring of the jitter intensity at the selected operation frequency.

In this case, at least the jitter intensity at the selected operation frequency is stored, respectively. If required, further parameters which are measured at the operation frequency are stored. The measuring of the jitter intensity in this case must occur over a comparably long time period, in order to compensate for statistical variation which may occur during the operation. In the second embodiment, a measuring time of 20-30 minutes is provided, for example. The frequency is in this case increased by 100 Hz each time in order to then measure the jitter intensity. In a first stage, the frequency is increased up to a first upper limit frequency of 900 Hz. As soon as the jitter disappears or the jitter intensity falls below a permissible threshold, the increase of the frequency will no longer be continued, the current frequency also for the future operation is secured in a non-volatile memory so that at the next re-switching-on of the integrated lamp, it will be started using the previously operated frequency.

If it was not possible to remove the jitter despite the increase up to the first upper limit or if it was not possible to reduce the jitter intensity below a permissible threshold, then the counter reading of the jitter minimum search is increased by one and the frequency is further increased until the triple value of the first upper limit frequency, in this case thus 2700 Hz, of the so-called upper limit frequency is reached. Then, the frequency is well-directedly selected out of the entire measured range between the lower limit frequency and the second upper limit frequency, at which the least jitter has been shown. The jitter intensity associated with the least jitter is multiplied by a factor of higher than 1 and is stored as a new permissible threshold, the so-called current jitter limit.

In the following, the monitoring and measuring of the jitter remains activated and it will be periodically examined whether the current jitter intensity is above the current jitter limit. If this is the case, it will be jumped to the frequency which has shown the second lowest jitter intensities in the examination of the lamp described above in the context of this process. The lamp will then be operated at this frequency, wherein also the monitoring and measuring of the jitter continues to be activated. If the current jitter intensity is again above the current jitter limit, it will be jumped to the frequency having the third lowest jitter intensity. If, in the subsequent operation, the current jitter intensity is also above the current jitter limit in this case, then the counter reading of the jitter minimum search will again be increased by one and a new cycle of the minimum search is started, wherein the entire frequency range between the lower limit frequency and the second upper limit frequency will be examined.

The counter reading, how often the jitter minimum search has already been activated, as well as the current jitter limit are stored in the non-volatile memory of the operation electronics (920, 930). These both values can be read out via the communication interface of the integrated gas discharge lamp e.g. via an LIN bus. In the context of the maintenance of the vehicle, e.g. in the context of the inspection after the expiration of a maintenance interval, or because the vehicle is in the garage due to a defect, the both values are read out and are compared with limit values, which represent values still to be tolerated. The limit values can also be stored in the integrated gas discharge lamp and can be read out via the communication bus, however, for reasons of simplicity, are stored in the diagnostic device of the garage. In case one of the read out values is above the associated limit value, the integrated gas discharge lamp (5) is to be replaced by a new integrated gas discharge lamp. This procedure substantially increases the availability of the illumination system, without thereby causing noteworthy costs, since the lamp is not replaced unnecessarily early and since no noteworthy additional effort in time occurs during the maintenance, since the vehicle is connected to the diagnostic device anyway.

The limit values with which the data are from the non-volatile memory are compared, may be altered depending on the also read out of the non-volatile memory accumulated burning time ($t_k$) or the accumulated weighted burning time ($t_{kg}$), so that e.g. the jitter limit of an old lamp is allowed to be higher than the same of a new lamp, without the need of replacing the lamp. The dependencies of the limit values depending on the burning time of the lamp are provided by the lamp manufacturer to the vehicle manufacturer, so that he or she may maintain the data e.g. in the form of a table or data matrix in his or her diagnosis device.

In a third embodiment, it is proceeded in analogy to the second embodiment, however, in particular to save memory space in the microcontroller, only the value of the up to that time minimum occurring jitter intensity and the associated operating frequency are stored. This means that instead of a real mapping, only a minimum search with respect to the jitter intensity is carried out. In case there should have been no above outlined interruption of the search in the first search process up to the first upper limit frequency, it will also be continued to be searched up to the second upper limit frequency as in the second embodiment. Subsequently, it can be directly jumped to the frequency stored in the minimum memory. Subsequently, the lamp will be operated for at least 30 min at this frequency and during this time, the jitter intensity will be determined over this time period. In case this is increased by more than a permissible factor of e.g. 20% compared with the initial one, a new search for the best possible operating frequency is started and it will be proceeded as described above.

Due to the increase of the operating frequency of the gas discharge lamp burner over its burning time, a jitter tendency of the burner may remarkably be reduced without the need of cost-intensive measures at the circuit arrangement. Due to the fact that the operation electronics of the integrated gas discharge lamp 5 includes a microcontroller, the entire process may be implemented in the software of the microcontroller, and does not cause any additional costs. Also the circuit arrangement for detecting jitter of the second embodiment may be implemented in pure software in a clever layout. Due to the fact that the quantities to be measured required for the detection of jitter may already be applied to the microcontroller for other reasons, by a suitable evaluation of these quantities a detection unit may be implemented in software. The circuit portions required in hardware are in this case already present for other reasons and do not cause additional costs.

Communication Interface

As already outlined above, the integrated gas discharge lamp 5 may have communication means or at least one communication interface, which in particular enables a communication with the on-board electronics of the vehicle. An LIN bus seems to be particularly advantageous, but also the connection of the integrated gas discharge lamp by means of a CAN bus to the on-board electronics is possible.

The lamp can in an advantageous manner communicate with the superordinate control system, e.g. a light module in a vehicle, via the communication interface. In this case, manifold information about the integrated gas discharge lamp 5 can be transmitted to the superordinate control system via the communication interface. This information is stored in a non-volatile memory in the lamp. In the manufacturing of the integrated gas discharge lamp 5, manifold information accumulates, which can be collected by the manufacturing equipment and which is programmed into the non-volatile memory of the lamp at the end of the manufacturing of the lamp. However, the information can also be directly written into the non-volatile memory of the operation electronics of the integrated gas discharge lamp, therefore, for this purpose, a communication interface is not absolutely necessary.

In the manufacturing, e.g. the gas discharge lamp burner 50 is exactly measured and, in the capping on the base 70, fixed in an exactly defined position at the base with respect to a reference plane of the base. This ensures a high performance of the optical system of integrated gas discharge lamp 5 and headlamp, since the electric arc burning between the gas discharge lamp electrodes 504 takes an exact position with respect to the reference plane, which represents the interface to the headlamp. The manufacturing machine thereby knows e.g. the distance and the position of the electrodes. The electrode distance may, however, represent an important parameter for the operation electronics, since the electrode distance of the gas discharge lamp burner 50 correlates with the burn voltage. Furthermore, a unique serial number or alternatively a manufacturing charge number may be stored in the non-volatile memory of the lamp in order to ensure a backtraceability. Using the serial number, the parts built in the integrated gas discharge lamp 5 together with all available data may be requested via a database maintained by the manufacturer, in order to be able to find the lamps associated with manufacturing errors of individual parts.

In an embodiment of the integrated gas discharge lamp 5, further parameters about the on-board electronics, which are measured during the lamp operation and which are stored in the non-volatile memory of the integrated gas discharge lamp 5, can be requested and also stored-in via the communication interface. By way of example, it may make sense to store the data of the optical system, out of which the headlamp consists, in the integrated gas discharge lamp 5, since it can control the power of the gas discharge lamp burner 50 using the same such that a smoothly high light output of the headlamp system is achieved.

In particular the following communication parameters may be used as communication parameters:

The accumulated burning time of the gas discharge lamp burner 50,
the number of the occurring jitter effects, thus the number of exceedings of the permissible limit value,
the number of starts of the jitter minimum search,
the current lamp power,
the current frequency of the alternating current converter,
the setpoint of the lamp power (=lamp target setpoint power),
the actual value of the lamp power,
the temperature of the electronics,
the serial number or the charge number, the number of the lamp going-out in total and the number of the lamp going-out within a previous time period, e.g. 200 h, the number of non-ignitions.

In principle, also a conventional operation electronics which is not integrated in the lamp base of the discharge lamp could have detected these parameters and could have provided the same via a communication interface. However, these parameters would not have been usable for a diagnosis in the context of the service of the vehicle, since the lamp could have been replaced at any time independent from the operation electronics and the read out parameters thus would not necessarily have to describe the currently existing system of lamp and operation electronics. The described system of an integrated gas discharge lamp, in which a gas discharge lamp burner and an operation electronics are unseparably integrated in a lamp, does not have this disadvantage.

The communication interface is in this case e.g. an LIN bus or alternatively a CAN bus. Both interface protocols are widely spread and introduced in the automobile sector. In case the integrated gas discharge lamp 5 is not used in an automobile, the communication interface of the integrated gas discharge lamp 5 may also include a protocol widely spread in the general lighting such as DALI or EIB/Instabus.

Based on these data (primarily of the accumulated burning time) the superordinate control system present in the vehicle may calculate the anticipated replace time instant of the integrated gas discharge lamp 5. At an inspection date of the vehicle, it may then be decided, as to whether the integrated gas discharge lamp 5 will work properly until the next inspection date, or as to whether it has to be replaced, since e.g. a bad light quality or even a failure of the lamp has to be suspected.

Due to the fact that the data can be read out via a communication interface of the integrated gas discharge lamp, a service technician may read out the data from the integrated gas discharge lamp and may replace the lamp as needed before a failure, as this has already been described above with respect to a jittering lamp.

In case the data from the manufacturing of the integrated gas discharge lamp are stored in an unchangeable manner in the non-volatile memory of the operation electronics, the lamp may always come back to these data in its lifetime calculations, with the result that the lifetime calculations, i.e. the estimation of the time period as to how long the integrated gas discharge lamp will work properly, will become substantially more accurate. By way of example, data are stored in the non-volatile memory of the operation electronics, from which the manufacturing time interval can be derived. Thereby, possible wrong productions or only later detected defects in a charge may be replaced also in the field, before the lamp fails. This is of great use for the user of the vehicle, since in particular in the use of the integrated gas discharge lamp in a headlamp, this is a particularly security relevant application. In case data are stored in the non-volatile memory of the operation electronics, by which the integrated gas discharge lamp is uniquely identified, the data stored in a database during the manufacturing may be easily and reliably be associated with the lamp. This works particularly efficient in case a definite and unique serial number is stored in the non-volatile memory of the operation electronics. These include inter alia also a manufacturer code coordinated via all manufacturers, so that different manufacturers of the same type of the integrated gas discharge lamp can indeed assign a consecutive number in its respective production, however, it is ensured that there will not be a second lamp, which has the same serial number.

During the operation of the integrated gas discharge lamp, one or more numbers are e.g. stored in the non-volatile memory, which monotonically increase with the burning time and/or with the number of the ignitions of the integrated gas discharge lamp. In this case, the burning time of the gas discharge lamp burner is detected, accumulated and stored as accumulated burning time in the non-volatile memory of the operation electronics. The accumulated burning time is e.g. stored in the non-volatile memory in the form of a number. The burning time may also be weighted by operation parameters and may be stored as a number in the non-volatile memory of the operation electronics, wherein this number then corresponds to the accumulated weighted burning time. The different types of the accumulated burning time will be dealt with in more detail further below. Thus, the previous burning time may reliably be matched with the lifetime specified by the manufacturer, and an accurate assertion about the remaining lifetime may be made. The lifetime specified by the manufacturer may in this case be a function of further data also read out of the non-volatile memory, so that this may e.g. be dependent on the number of the starts or the requested luminous flux of the lamp. The decision about as to whether the integrated lamp has to be replaced, may, for economic reasons, furthermore be made from the data stored in the diagnosis device of the service garage and which have been determined in the context of the past garage visits, and thus, e.g. the information as to how intensively the light had been used within the past service intervals may be taken into account in the decisions to be made.

In case a number stored in the non-volatile memory of the operation electronice makes an assertion about the jitter of the lamp, in particular the number of the starts of the jitter minimum search or the current jitter limit, the condition of the integrated gas discharge lamp may be detected accurately and read out as needed. These values may be taken into account in a service of the vehicle, in which there is the integrated gas discharge lamp, for the evaluation of the remaining lifetime. The number stored in the non-volatile memory of the operation electronics about the number of the ignitions of the gas discharge lamp burner may also be interesting for the service technician, since the number of the ignitions has an influence on the lifetime as well as the burning time. At a service date of the vehicle, thus, data are read out of the non-volatile memory of the operation electronics and there is provided for a different proceeding in the maintenance depending on the data. The maintenance thereby becomes more efficient and better, early failures become rare and the customer satisfaction increases. The decision whether the gas discharge lamp burner has to be replaced may be based, in addition to the experience of the service technician, on data read out of the non-volatile memory of the operation electronics. The decision to replace the integrated gas discharge lamp will be e.g. made at a time when the accumulated burning time and/or the accumulated weighted burning time and/or the number of the ignitions of the gas discharge lamp burner is above a certain limit value. The limit value in this case preferably depends on the production time interval and/or on the data which allow a unique identification of the integrated gas discharge lamp. A reliable and simple decision about the replacing of the integrated gas discharge lamp is thereby made possible.

Lumen Constancy

The information stored in the non-volatile memory of the integrated gas discharge lamp 5 may, however, also be used to maintain the light output of the integrated gas discharge lamp 5 constant over the lifetime thereof. The light output at nominal power of gas discharge lamps changes over the lifetime thereof. With advancing burning time the efficiency of the lamp decreases due to blackening and devitrification of the discharge container, by burn-off of the electrodes and the change of the discharge arc caused thereby. The efficiency of the overall optical system is thereby further decreased, since these systems are usually dimensioned for a spot light source or for the shortest discharge arc resulting from the minimum electrode distance and more light gets lost in the optical system in case of an elongation of the discharge arc.

Also the optical system itself loses efficiency during its lifetime, either by occurring lens opaqueness or by defocusing due to temperature cycles or the vibrations permanently occurring in automobile headlamps. In the following it is referred to a lamp burning time $t_k$ and an accumulated weighted burning time $t_{kg}$, wherein the accumulated weighted burning time $t_{kg}$ is weighted with a weighting function $\gamma$ which will be further discussed below.

Figure 27:
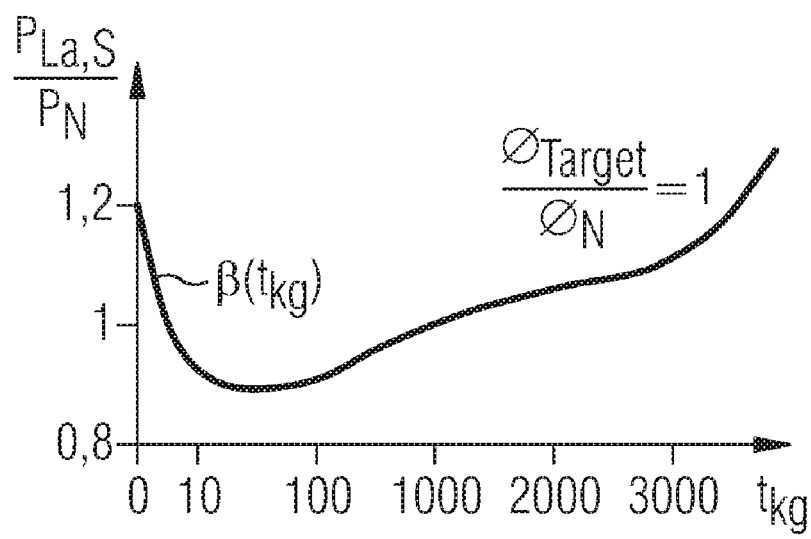
FIG. 27 shows a graphics, which illustrates the functional relationship between the normalized target burn power and the accumulated weighted burning time of the gas discharge lamp burner.

Since the operation electronics of the integrated gas discharge lamp 5 has stored the relevant parameters of the gas discharge lamp burner 50 in the non-volatile memory, it can adapt the operation power $P_{LA}$ applied on the gas discharge lamp burner 50 to the accumulated burning time. Since the aging process does not proceed linearly, according to a simple embodiment, a compensation function β is stored in the operation electronics, as it is shown in FIG. 27. In this case, the accumulated weighted burning time $t_{kg}$ of the lamp is depicted in relation to the quotient of the lamp power $P_{LA}$ to the nominal power $P_N$ of the gas discharge lamp burner 50. In the lower section below 10 h burning time, the power is slightly increased. This helps to then coordinate the gas discharge lamp burner 50. This is also known as "burning-in" of the gas discharge lamp burner 50 of the integrated gas discharge lamp. Upon burning-in of the lamp, it is further operated with slightly reduced power (approximately 90% of the nominal power), since the efficiency of the lamp as well as of the optics is still very good. From an accumulated weighted burning time $t_{kg}$ of approximately 100 h on, the power increases again, in order to reach a lamp power $P_{LA}$, which is approximately 10% higher than the specified lamp normal nominal lamp burner lamp power, when reaching the specified lifetime of 3000 h. Thereby, the light output of the gas discharge lamp burner is substantially constant over its burning time. The function stored in the operation electronics can be influenced by burner parameters, such as the electrode distance, stored in the non-volatile memory.

In an advanced system having a control of the integrated gas discharge lamp 5 achieved by a superior control system, further light functions, such as speed depending control of the output light amount, may be realized. In such an advanced embodiment, the operation electronics is configured such that it can operate the gas discharge lamp burner 50 with an underpower or an overpower. However, if the gas discharge lamp burner 50 is not operated with nominal power, then it ages differently compared to an operation at nominal power. This has to be taken into consideration in the calculation of the cumulative burning time. Hereunto, a weighting function γ is stored in the operation electronics, which represents a factor dependent on the underpower or overpower.

Figure 28:
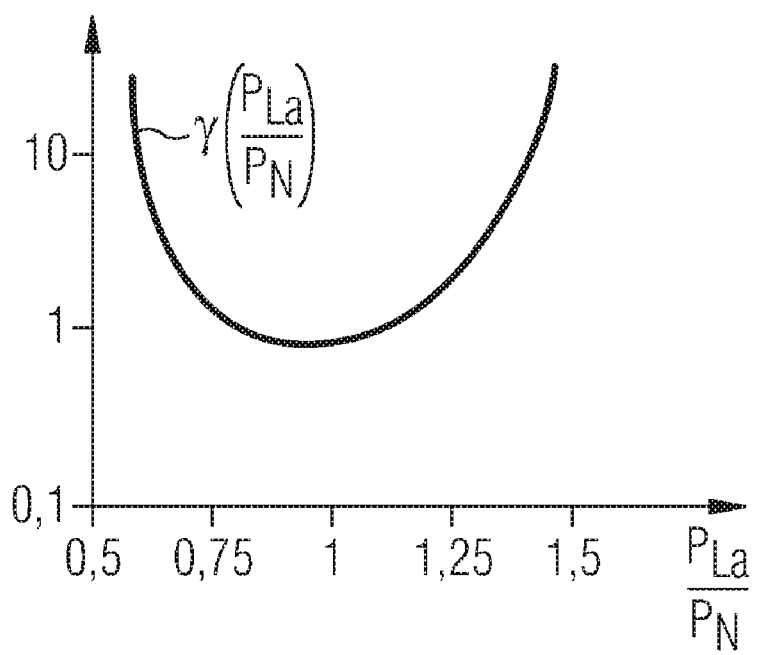
FIG. 28 shows a graphical illustration of the weighting function γ.

FIG. 28 shows the weighting function γ for an integrated gas discharge lamp 5 configured for the use in the front headlamp of a motor vehicle. If the gas discharge lamp burner 50 is operated with significant underpower, then it again ages faster, since the electrodes are too cold and, hence, electrode material will be sputtered-off, whereby electrode material will be removed by sputtering, which is undesired since this reduces the lifetime of the lamp and reduces the light yield. Therefore, the operation electronics of the integrated gas discharge lamp 5 has to include this aging into the accumulated weighted burning time $t_{kg}$. This may, for example, be done by the following formula:

$$t_{kg}(t) = \int_{0h}^{t} f(\tau) \cdot \gamma\left(\frac{P_{LA}(\tau)}{P_N}\right) d\tau.$$

In this respect, the function f(τ) only means burning function. That is, as soon as the gas discharge lamp burner 50 operates, f(τ)=1, and when the gas discharge lamp burner does not operate, f(τ)=0. Accordingly, when the integrated gas discharge lamp 5 is operated at underpower or overpower, it ages faster by a factor which may reach the value ten.

Figure 29:
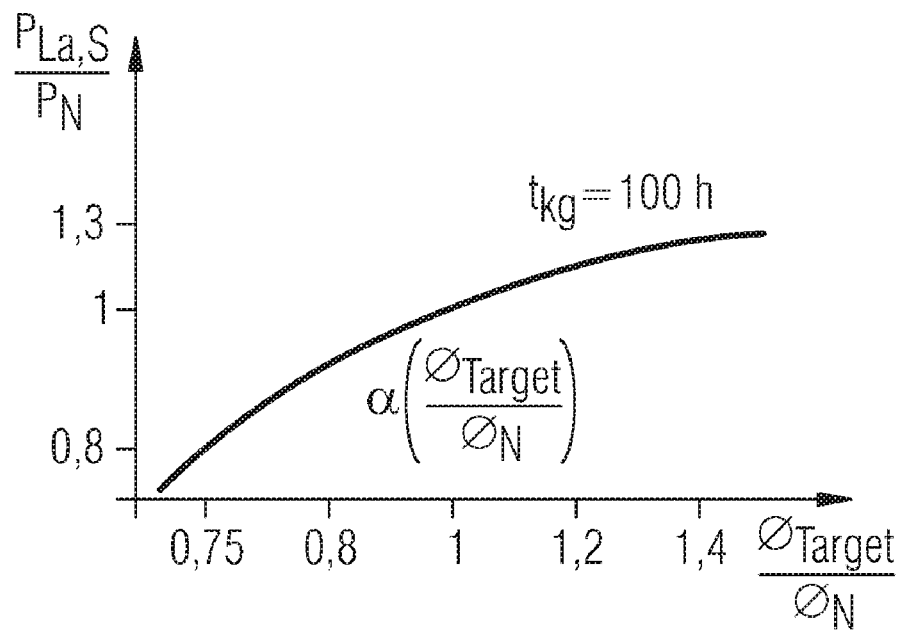
FIG. 29 shows a graphical illustration of the function α.

In an advanced control system, which can operate the gas discharge lamp burner 50 at underpower or overpower, it can also be implemented an advanced communication by the superior control device. This may be provided such that the superior control device does not request a determined power from the integrated gas discharged lamp 5, but requests a predetermined light amount. In order to achieve this, a dim curve is stored in the operation electronics of the integrated gas discharge lamp 5. FIG. 29 shows such a dim curve a using the example of an integrated gas discharge lamp 5 for the automobile technology. The dim curve shows the dependency of the luminous flux $\Phi_{Soll}$ output from the gas discharge lamp burner 50, or the luminous flux $$\frac{\phi Soll}{\phi N}$$

normalized to the nominal luminous flux $\Phi_N$ as shown in FIG. 29, from the electrical burner power $P_{LA,S}$, or the burner power $$\frac{P_{LA,S}}{P_N}$$

normalized to the electrical normal nominal burner power $P_N$ as shown in FIG. 29. In FIG. 29, this is depicted at an accumulated weighted burning time $t_{kg}$ of the gas discharge lamp burner 50 of 100 h. For another accumulated weighted burning time $t_{kg}$ of the gas discharge lamp burner 50 other curve progressions will arise. In the ideal case, thus, a three-dimensional mapping is stored in the operation electronics of the integrated gas discharge lamp 5, which takes into consideration the age of the gas discharge lamp burner 50. Thus, FIG. 29 is only a section through the mapping for an accumulated weighted burning time $t_{kg}$ of gas discharge lamp burners of 100 h. The mapping for determining the lamp power may include further dimensions in addition to the luminous flux and the accumulated weighted burning time, such as the burning time since the last ignition of the lamp or the estimated burner temperature in order to in particular image effects in the range up to few minutes after the ignition, caused by thermal transients during the so-called start-up of the lamp, wherein among others vaporization of the filling occurs. The dim curve does not necessarily have to be stored in the operation electronics of the integrated gas discharge lamp 5 as mapping, but it can also be stored as a function so that it can be calculated by a microcontroller integrated in the operation electronics. In order to be able to implement the calculation of the lamp power, which is to be set, in a manner as easy as possible, the underlying function or the corresponding mapping may be approximately expressed by a product, wherein as factors, in addition to the nominal power $P_N$ of the gas discharge lamp burner, each individual factor describes the influence of the above-mentioned parameters. Thus, the required burner power $P_{La}$ for a determined light amount can be exemplary expressed by the following formula:

$$P_{La} = P_N \cdot \alpha\left(\frac{\phi Soll}{\phi N}\right) \cdot \beta(t_{kg}).$$

In this respect, the factor β takes into consideration the aging of the gas discharge lamp burner 50. The function β may also include the aging of the optical system, wherein these data are e.g. communicated via the communication interface of the integrated gas discharge lamp so that these influences can also be taken into consideration in the calculation of the operation electronics of the integrated gas discharge lamp. In this respect, the light amount given by the control device may be dependent on the speed of a vehicle, in which the integrated gas discharge lamp 5 is operated. At slow speed, for example, the lamp is operated in a dimmed manner, whereas at high speed, such as on the interstate, it is operated slightly above nominal power in order to ensure a wide view and a good illumination of the roadway.

Figure 30:
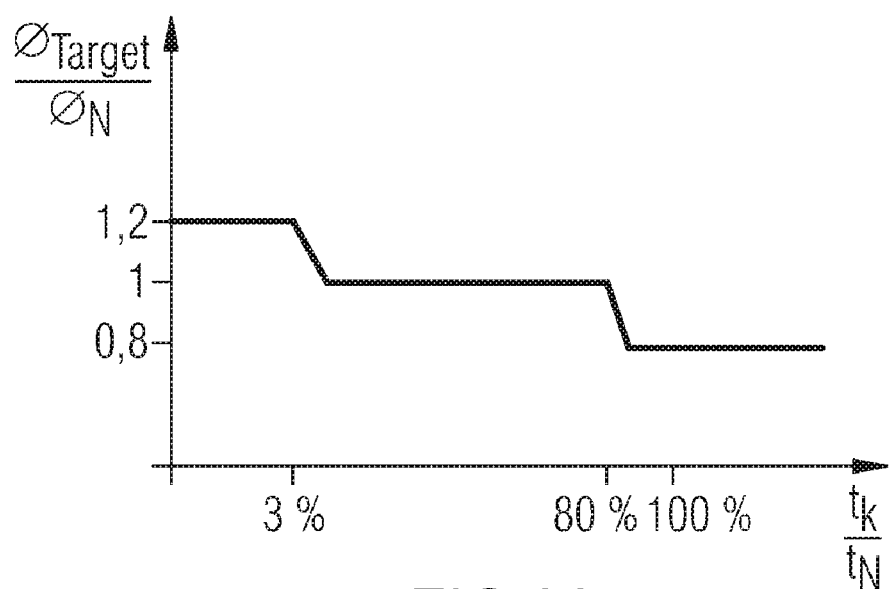
FIG. 30 shows a graphical illustration of the normalized target luminous flux dependent on the normalized accumulated burning time of the gas discharge lamp burner.

In an advanced operation electronics of a further embodiment of the integrated gas discharge lamp 5, the previous burning time of the gas discharge lamp burner 50 during operation can alternatively or additionally be taken into consideration. When the accumulated weighted burning time $t_{kg}$ approaches the specified lifetime end of the gas discharge lamp burner, the operation electronics can operate the burner at a power which lets it age at lowest rate and, hence, increases its lifetime with regard to a usual operation. FIG. 30 shows such an exemplary burner preserving curve, in which the luminous flux quotient $$\frac{\phi Soll}{\phi N}$$

is depicted above the cumulated normalized lifetime $$\frac{t_k}{t_N}.$$

The latter is calculated from the lamp burning time $t_k$ divided by the nominal lifetime $t_N$ of the lamp of, for example, 3000 hours. Up to 3% of its nominal lifetime, the gas discharge lamp burner 50 is operated at 1.2-times of its nominal power in order to condition and burn-in the gas discharge lamp burner 50. Thereafter, the gas discharge lamp burner 50 is operated at nominal power for a certain time. When the gas discharge lamp burner 50 reaches 80% of its lifetime, the power will be reduced successively to about 0.8-times of the nominal power. The weight function in FIG. 28 discloses at closer consideration that the lamp is mostly preserved when being operated at 0.8-times of its nominal power. Therefore, the integrated gas discharge lamp 5 will be operated at this power when approaching its lifetime end in order to ensure a remaining lifetime which is as long as possible and to avoid a sudden lamp breakdown which may have a fatal outcome in particular in the field of automobiles. Instead of the lamp burning time $t_k$, also the accumulated weighted burning time $t_{kg}$ may be used in contrast to the depiction in FIG. 30.

On the basis of the above-mentioned data and calculations, the integrated gas discharge lamp 5 can calculate the expected remaining lifetime of its gas discharge lamp burner, and can store it in a non-volatile memory of the operation electronics 220, 230. Hence, if the motor vehicle is in the garage for inspection, then lamp data of interest for the inspection, in particular the stored remaining lifetime, may be read out. On the basis of the read out remaining lifetime, it may then be decided whether the integrated gas discharge lamp 5 is to be replaced. It is also possible that the serial number of the integrated gas discharge lamp and/or the serial number of the gas discharge lamp burner 50 are stored in the in the integrated gas discharge lamp 5. On the basis of the serial number, the mechanic in the garage can request via a manufacturer database whether the lamp is all right or has to be replaced, for example, because of failures in the manufacture or because of failures of components incorporated thereinto.

In a further advantageous embodiment of the integrated gas discharge lamp 5 and in contrast to the previously described embodiment, in the garage the expected remaining lifetime will not be read out, but the data will be read out, as to how the lamp has been actually operated. These data will then be judged by a diagnosis apparatus on the basis of the nominal data, assigned to the respective serial number, from the manufacturer database. In this respect, for example, the nominal lifetime $t_N$ of a lamp having a given serial number is deposited in the manufacturer database. This would be correspondingly low in case of product defects. Since also further data about the operation will be stored in the operation electronics, such as number of ignitions, also these parameters may be compared to the manufacturer database, which then, e.g., includes the number of nominal ignitions for each lamp. In this respect, a high number of ignitions read out from the operation electronics, which approaches the nominal ignitions, leads to the decision that the lamp is to be replaced, although, for example, the nominal lifetime of the lamp is not yet reached. By using such criterions, the availability of the light source is increased in an economical manner. This proceedings has to be seen as being particularly economical because the lamp will be replaced only then when the likelihood of its imminent breakdown is high. The manufacturer of the lamp is decoded in the first bit of the serial number of the lamp so that it is ensured that the serial number is kept non-ambiguous, although, for example, several lamp manufacturers produced interchangeable products. When requesting nominal data, such as the nominal lifetime or the nominal ignitions, from the manufacturer database via communication connection between the garage and the lamp manufacturer, for example via an internet connection, the data about the operation and read out from the operation electronics are in return transmitted to the lamp manufacturer. Accordingly, a bi-directional data exchange occurs between the operation electronics of the lamp and the manufacturer database. On the one hand, this allows tracking of products in the field, in particular allows statistical investigations about the kind of use of the product, which is in particular of high advantage regarding further product development. However, individual data investigations is also possible insofar as, for example, the VIN (Vehicle Identification Number) of the vehicle is transmitted in addition to the serial number.

Furthermore, the possibility of protection against product counterfeiting is offered. The latter is achieved in that in case of product counterfeiting the serial number has to be copied, too, which, when transmitting the data to the manufacturer, finally leads to an apparent inconsistency of the data, since, for example, the operation hours which are assigned to a serial number can not decrease again, which allows a corresponding conclusion that counterfeited products are present.

Arc Straightening

In the following, a method of straightening the discharge arc of the gas discharge lamp burner will be described, which is implemented in an embodiment of the integrated gas discharge lamp 5. A first embodiment is based on an operation electronics 920 which has a topology according to FIG. 23. In this respect, the operation electronics 920 includes a DC voltage converter 9210 which is supplied by the battery voltage of the automobile. A DC-AC-converter is connected downstream to the DC voltage converter via an inter-circuit condenser, which supplies AC voltage to a gas discharge lamp burner 50 via a lamp circuit. The lamp circuit consists of an output condenser $C_A$ and an ignition electronics 910, with the primary winding of the ignition transformer being in the lamp circuit, as well as of the gas discharge lamp burner 50. By means of this topology, which is commonly known from prior art, a straightening of the discharge arc can be achieved by appropriate configuration.

A straightened discharge arc offers many advantages. A first significant advantage is provided by the better thermal conditions of the gas discharge lamp burner 50, obtained by a more even thermal wall stress of the burner container. This leads to a better thermal utilization and, thus, to an increased lifetime of the burner container. A second significant advantage is provided by the contracted light arc which has a reduced diffusivity. With such a more narrow arc, the optics of a headlamp, for example, can be provided more precisely and the light yield of the headlamp can be significantly increased.

Since the ignition and operation electronics 910, 920 or the overall operation electronics 930 (in the following also called operation electronics) in the integrated gas discharge lamp 5 are inseparably connected to the gas discharge lamp burner 50, the operation electronics can itself calibrate to the gas discharge burner 50 in order to generate a stably burning straight arc. Since due to the inseparability of the operation electronics 920, 930 and the gas discharge lamp burner 50 the burning time of the gas discharge lamp burner 50 is also known, aging effects of the gas discharge lamp burner 50 can influence the kind of operation of the gas discharge lamp burner 50.

The basic proceedings for straightening the arc of the integrated gas discharge lamp 5 is as follows: The operation electronics 920, 930 measures the gas discharge lamp burner 50 with regard to acoustic resonances when firstly switched on and detects the frequencies suitable for arc straightening. This is carried out by through scanning the frequency ranges between a minimum frequency and a maximum frequency. The frequencies are modulated onto the operation frequency of the integrated gas discharge lamp burners. During this scanning the impedance of the gas discharge lamp burner will be measured and the respective lowest impedance including the corresponding frequency will be stored. This frequency with the lowest impedance characterizes the maximum achievable arc straightening. Depending on the lamp type the minimum frequency can sink down to a frequency of 80 kHz, and the maximum frequency may reach a frequency of about 300 kHz. In a typical high pressure discharge lamp for the automobile technology the minimum frequency is about 110 kHz and the maximum frequency is about 160 kHz. The measuring is required for compensation of manufacturing tolerances of the gas discharge lamp burners 50. The typical aging with regard to the resonance frequency of the lamp is stored in a micro controller (not shown), for example in a table, of the operation electronics 920, 930. The values in the table may be stored in dependence on the kind of operation of the gas discharge lamp burner (cycle shape, start-up or dimmed operation). In addition, in a further embodiment, the controlled operation may be upgraded by a controlled modulation operation with a modulation frequency being in a narrow range around the calculated frequency (in accordance with the controlled operation). The calculated frequency will be modulated with a modulation frequency of, for example, 1 kHz in order to obviate possible jitter appearances by stimulation of acoustic resonances in the gas discharge lamp burner 50. Compared to the recent operation devices according to the prior art an advantage consists in that now the frequency range (within which the frequency is allowed to by varied) is very small, and the problems regarding extinguished lamps or instable controller behavior are less. Nevertheless, it may make sense for certain types of lamps to measure the frequency ranges around the actual modulation frequency with respect to its jittering behavior in order to be able to ensure a stable lamp operation. Hereunto, according to an embodiment, the circuit configuration for detecting jittering is used, and frequencies close to the modulation frequency are measured with regard to their jittering behavior.

Figure 23:
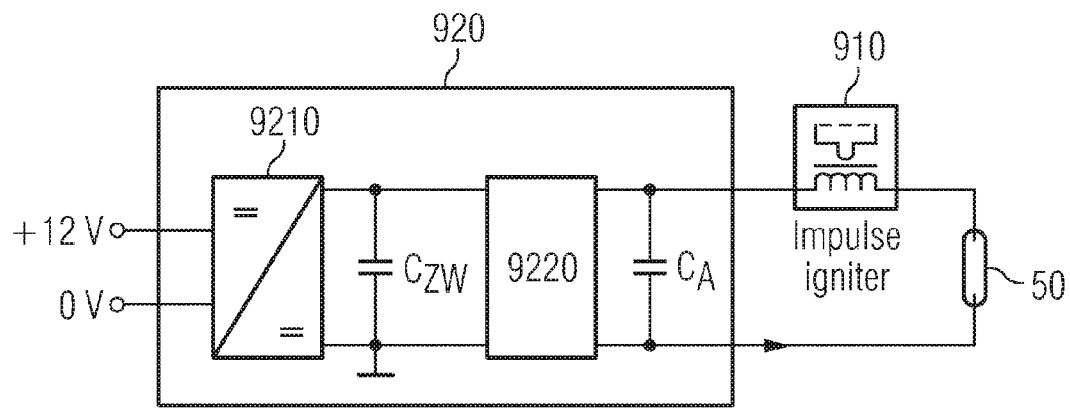
FIG. 23 shows a circuit topology for an operation mode having a straightened electric arc in a first embodiment.

In a first embodiment according to FIG. 23, the frequency of the DC voltage converter 9210 is selected to be equal to the modulation frequency. By corresponding configuration of the inter-circuit condenser $C_{ZW}$, a high frequency rippel remains as on-modulated high-frequency AC voltage on the DC voltage output by the DC voltage converter 9210. The DC voltage with the on-modulated high-frequency AC voltage serves as input voltage for the DC-AC-converter 9220. In this case, the DC-AC-converter 9220 is provided as full bridge which converts the DC voltage into a rectangular AC voltage. The amplitude of the modulation signal, that is, of the on-modulated high-frequency AC voltage, determined by the dimensioning of the output filter of the full bridge (output condenser $C_A$) as well as by the inductivity of the secondary winding (IPSH, IPSR) of the impulse ignition transformer. Because of the fact that in the integrated gas discharge lamp 5 these components are inseparably connected to each other, a good adjustment of these components to the desired kind of operation is possible. By means of the superimposed high-frequency voltage the desired straightening of the discharge arc occurs. The disadvantage of this embodiment is the stationary—frequency operation type of the DC voltage converter, which does not allow an effective switching relief so that the losses of the system will increase.

Figure 24:
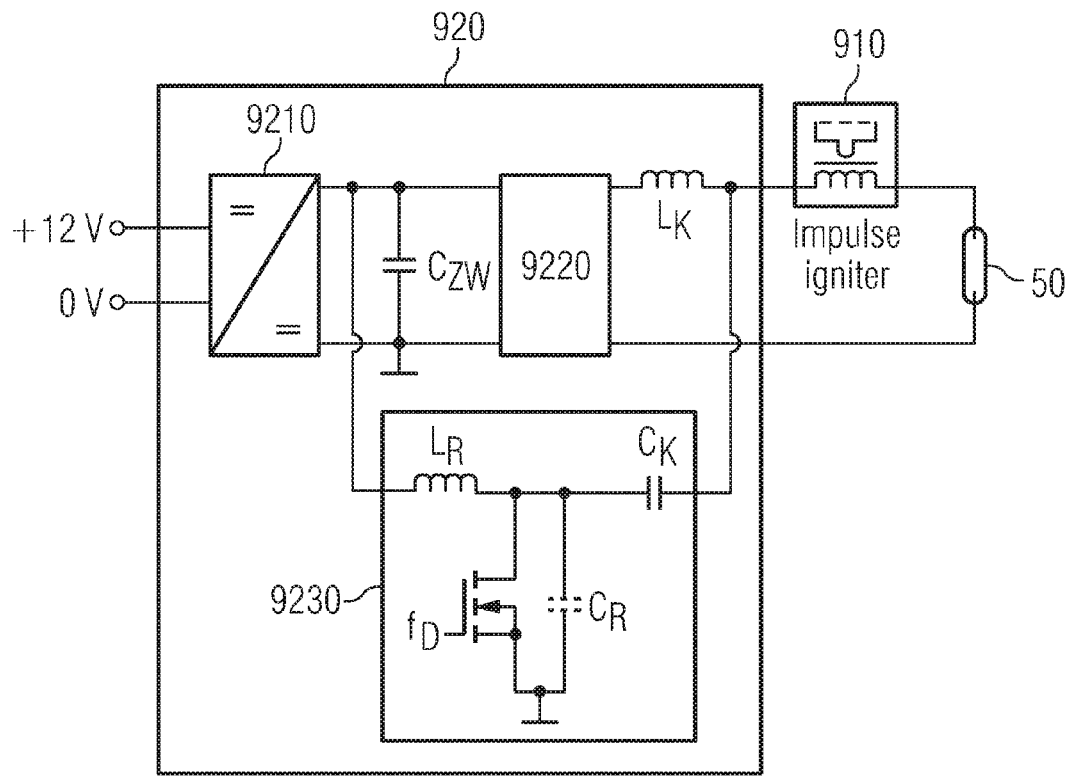
FIG. 24 shows a circuit topology for an operation mode having a straightened electric arc in a second embodiment.

In a second embodiment according to FIG. 24, the superimposed high-frequency voltage is generated by a signal generator 9230. This one couples the high-frequency voltage in the lamp circuit into between the choke $L_K$ and the primary winding of the ignition transformer of the ignition electronics 910. The in-coupling upstream the ignition transformer is of importance, since the signal generator 9230 otherwise would have to be provided in a high-voltage safe manner. The choke serves the decoupling of the inter-circuit condenser $C_{ZK}$, since it otherwise would dampen the in-coupled high-frequency voltage too much. Due to this, the inductivity of the ignition transformer of the ignition electronics 910 should be as small as possible. In this respect, the signal generator may be configured such that the frequency of the in-coupled high-frequency voltage is in turn modulated in order to achieve a safe and jitter-free operation of the gas discharge lamp burner 50.

Figure 25:
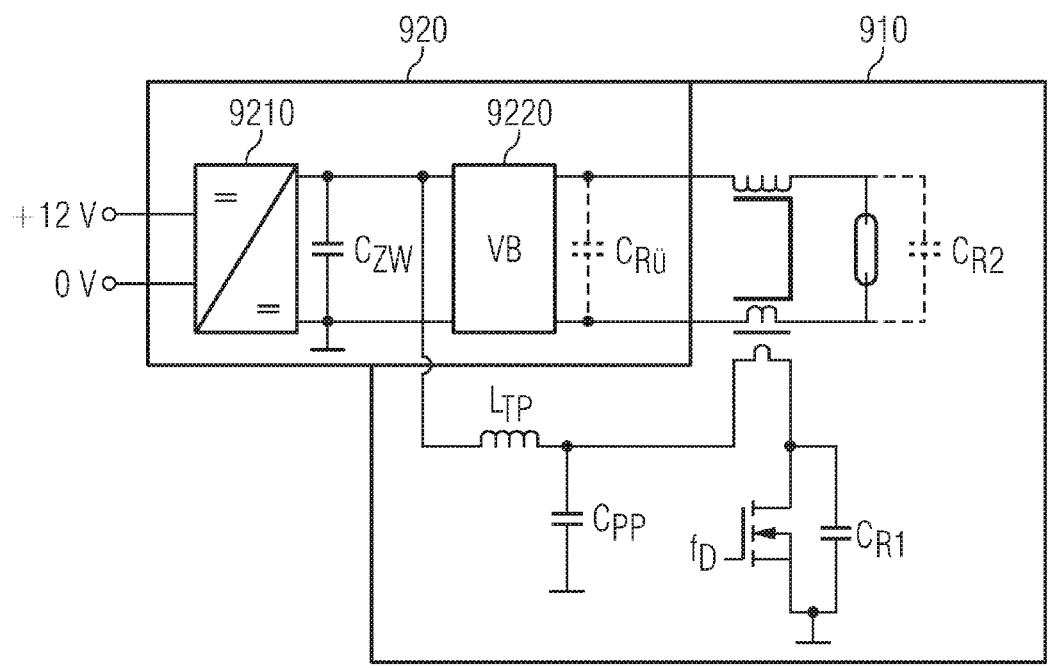
FIG. 25 shows a circuit topology for an operation mode having a straightened electric arc in a third embodiment.

In a third embodiment which is shown in FIG. 25, the signal generator is integrated in the ignition electronics 910. In this case, the gas discharge lamp burner 50 will be started by resonance ignition. The ignition electronics includes an ignition transformer $T_{IR}$ configured for high-frequency operation and controlled by a signal generator which is provided as class-E converter. The ignition transformer $T_{IR}$ is to be dimensioned such that it can at least transmit the fundamental wave of the occurring high-frequency, which is identical to the switching frequency of the class-E converter, in sufficiently well manner, in particular that its efficiency at this frequency is higher than 10%. The switching frequency of the class-E converter during the ignition has an amount between 80 kHz and 10 MHz. By way of example, however, the frequency is selected to be above 300 kHz, since this allows a small design, and below 4 MHz, since in this case, the achievable efficiencies are particularly high. The control of the ignition transformer is provided by means of galvanically separated primary winding. The secondary winding is divided into two galvanically separated windings, which are respectively connected to between a lamp electrode and the DC-AC-converter 9220. In this case, the signal generator generates a high-frequency current through the primary winding of the ignition transformer $T_{IR}$, which activates a resonance in a resonance circuit on the secondary side, which provides the gas discharge lamp burner 50 to break through. In this respect, the resonance circuit consists of the secondary inductivity of the ignition transformer $T_{IR}$ and a capacity $C_{R2}$ arranged over the lamp. Since the capacity $C_{R2}$ is very small, it does not necessarily has to be integrated as a component in the ignition electronics 910, but may be created by design measures.

As soon as the gas discharge lamp burner 50 has ignited, the operation mode of the signal generator will be changed so that it couples-in only a high-frequency signal via the ignition transformer $T_{IR}$, which will be modulated onto the lamp voltage for arc straightening. This provides the advantage that the frequency and the amplitude of the on-modulated voltage are relatively freely adjustable without the need to waive an optimized kind of operation of the DC-voltage converter 9210 or of the DC-AC converter 9220. By this circuit topology, the ignition electronics 910 may also provide an increased taking-over voltage, generated via the resonance circuit, for the gas discharge lamp burner 50 so that it has not to be generated by the DC-voltage converter 9210. By this measure, the kind of operation of the DC-voltage converter can be further optimized, since the required output voltage range of the DC-voltage 9210 becomes smaller. In addition, the DC-AC converter 9220 has to transform less power, since a part of the lamp power is coupled in via the on-modulated lamp voltage. Thus, this embodiment offers the greatest degree of freedom in the implementation of the operation parameters so that an optimized and reliable operation of the gas discharge lamp burner 50 is possible at a straightened discharge arc.

Figure 26:
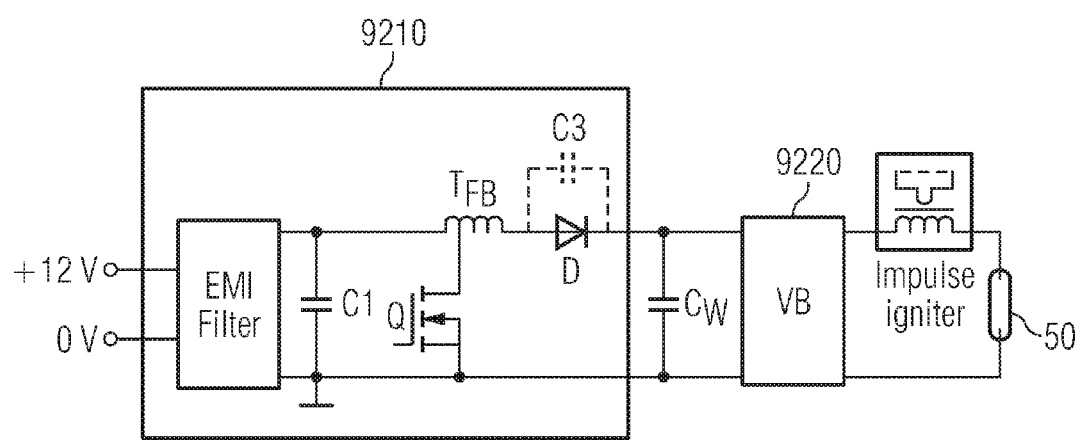
FIG. 26 shows a circuit topology for a simplified operation mode of a DC voltage converter.

FIG. 26 shows an embodiment, which is simplified in comparison to prior art, of a DC-voltage converter 9210. The DC-voltage converters for ballast devices as usual in prior art, which are operable in an onboard supply system, include a B.O.-type converter topography, which will also be referred to as Flyback, since the onboard voltage of an automobile has to augmented from 12V to a higher voltage. Due to the fact that in the integrated gas discharge lamp 5 the electrical contacting only occurs during insertion of the lamp into the headlamp 3, also a simplified converter in form of an augmenting actuator, which is also referred to as boost-converter, with an autotransformer $T_{FB}$ may be used. This is possible, since in the used electromagnetic interface an accident contacting of the converter output with the vehicle ground, which would result in a destruction of the boost-converted, can be excluded. The DC-voltage converters as recently used in prior art, allow an interruption of the energy flux, in spite of a short circuit on the output side. This is not the case in the present converter concept according to FIG. 26, since in this case no galvanic separation of the power path of the converter is provided, which could interrupt the energy flux from the converter, that is, from the 12 V onboard supply, to the output, that is, to the current supply of the gas discharge lamp burner 50, which was accidentally connected to the vehicle ground. In other respect, the DC-voltage converter is designed in common manner. It consists of an input side EMI filter, an input condenser Cl, a converter switch Q, an inductivity $T_{FB}$ provided as autotransformer, which operates onto the intercircuit condenser $C_{ZW}$ via a diode D. This converter is much cheaper compared to the B.O.-type converters as used in prior art, whereby the integrated gas discharge lamp 5, when considering the system, is significantly inexpensive as compared to a prior art lamp system having a gas discharge lamp and an external electronic operation device.

Various embodiments provide an integrated gas discharge lamp having a gas discharge lamp burner and an ignition electronics, which does no longer have the previously mentioned disadvantages.

Various embodiments provide an integrated gas discharge lamp including a lamp base, a gas discharge lamp burner, and an ignition electronics, characterized in that the integrated gas discharge lamp includes an operation electronics for operating the gas discharge lamp burner, wherein the gas discharge lamp burner, the ignition electronics as well as the operation electronics are unseparably coupled with each other. This makes a realization of an integrated gas discharge lamp possible, which no longer includes an interface with high voltage and thus is substantially more secure in the handling.

The ignition electronics and the operation electronics of the integrated gas discharge lamp are in this case e.g. arranged on different planes in the base. This makes the lamp more compact, however, builds higher. In this case, an electrically and/or thermally conductive plate is mounted between the ignition electronics and the operation electronics. This effects an improved cooling of the operation electronics and the ignition electronics. In the case that the ignition electronics and the operation electronics of the integrated gas discharge lamp are arranged in one plane, the lamp is not so high, but also less compact in the width.

The integrated gas discharge lamp includes a reference ring, which defines a reference plane, which can be coupled with an optical system, and the reference ring allows a defined spatial position of the gas discharge arc or the gas discharge lamp electrodes with respect to the reference plane of the reference ring. A good optical system may be generated thereby.

In case the lamp base consists of an insulating plastic and is enclosed by an electrically conductive casing, or consists of an insulating plastic and is coated with an electrically conductive coating or consists of electrically conductive plastic, an improved electromagnetic compatibility is given. In case the integrated gas discharge lamp includes a base plate, which consists of an electrically and/or thermally conductive material, or of a thermally conductive material, which is provided with an electrically conductive coating, then the operation electronics will be cooled better, and the integrated gas discharge lamp is shielded from all sides. In case the operation electronics is arranged on a surface of the base plate which faces the gas discharge lamp burner, a simplified and inexpensive construction of the integrated gas discharge lamp is given.

By way of example, the base plate includes, on a surface facing away from the gas discharge lamp burner, a surface increasing structure, which promotes a natural convection in built-in position. The operation electronics is particularly well cooled thereby. The cooling may be further improved in case the base plate includes a coating at its outer side, which results in an increased heat radiation.

The base and the base plate of the integrated gas discharge lamp are e.g. coupled by means of a crimp coupling, a catch lock coupling, an ultrasonic weld coupling, a solder coupling, or a weld coupling. This ensures a reliable coupling.

The lamp base of the integrated gas discharge lamp e.g. includes a seal at the burner-side end, which terminates an optical system, which is coupled to the integrated gas discharge lamp, in a water-proof manner. Unenclosed headlamps may be built thereby, which are smaller and more cost-efficient. In addition, the integrated gas discharge lamp is substantially better cooled. In case the seal effects a pre-stressing on the reference ring at the same time such that the integrated gas discharge lamp is retained in built-in position with respect to the optical system, also a secure seat is ensured, without the need of an additional component. This additionally reduces the costs.

In case the operation electronics is arranged on a printed circuit board, which has a circumferentially electrically conductive ring at its edge, and the base and the base plate respectively include at least one wall, which cooperate such that the electrically conductive ring rest at least partially on both walls and the printed circuit board is mechanically fixed and the electrically conductive ring is electrically conductively coupled to the base plate and/or the base, an excellent large-area ground connection of the operation electronics to the casing is ensured, which effects an excellent electromagnetic compatibility of the integrated gas discharge lamp.

The integrated gas discharge lamp is in this case e.g. used in a headlamp or in a working spotlight in a vehicle. However, the integrated gas discharge lamp may also be used in a pocket lamp or in a portable searchlight. Due to the easy handling and the simple power supply of the lamp, these may be fields of use, in which the lamp can combine the advantages of the gas discharge lamp technology with the advantages of the simple operation of filament lamps. The integrated gas discharge lamp is in this case e.g. supplied with energy by a battery or a fuel cell system.

The integrated gas discharge lamp, in the stationary operation mode, after the ignition and start-up phase, is e.g. operated such that an electrical power between 7 W and 50 W is supplied to the gas discharge lamp burner, in particular a power between 18 W and 45 W is supplied. This ensures an optimal start-up of the gas discharge lamp burner, without putting too much load on the energy supply. The indicated power range between 7 W and 50 W is beyond that the one, which on the one hand allows an efficient light generation in a gas discharge lamp, since it increases with increases electric power, on the other hand, however, still allows the cooling of the operation electronics with justifiable efforts, since it becomes greater and greater with increasing electric power in the intended compact shape.

In case the volume of the integrated gas discharge lamp is between 44 cm$^3$ and 280 cm$^3$, in particular between 65 cm$^3$ and 120 cm$^3$, then the integrated gas discharge lamp has an optimum ratio of volume to power, in which the operation electronics does not become too hot and the lamp does not become too large. By way of example, the integrated gas discharge lamp has a ratio of diameter to height, which is in the range between 0.8 to 10, in particular in the range between 2 to 7. This also ensures the compactness felt by the user, and a balanced surface to volume ratio puts the lamp to a good electrical efficiency and to a balanced temperature management. The integrated gas discharge lamp in this case e.g. has a mass, which is in the range between 36 g to 510 g, in particular in the range between 52 g to 178 g. Thus, the lamp is also well suited for vehicle headlamps.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. An integrated gas discharge lamp, comprising:
   a lamp base;
   a gas discharge lamp burner;
   an ignition electronics;
   wherein the base consists of two parts, a first part having an already aligned gas discharge lamp burner, and a second part, which contains the ignition electronics;
   and an operation electronics for operating the gas discharge lamp burner;
   wherein the gas discharge lamp burner, the ignition electronics as well as the operation electronics are unseparably coupled with each other;
   wherein the gas discharge lamp burner is held by a metal clamp, which is attached to retaining sheets, which are in turn connected to the first part of the base;
   wherein the first part of the lamp base includes a reference ring and the reference ring comprises partially or wholly a metal material.

2. The integrated gas discharge lamp as claimed in claim 1, wherein the reference ring defines a reference plane, and is configured to be coupled with an optical system; and wherein the reference ring defines a defined spatial position of the gas discharge arc with respect to the reference plane of the reference ring.

3. The integrated gas discharge lamp as claimed in claim 1, wherein the lamp base comprises at least one of:
   an insulating plastic and is enclosed by an electrically conductive casing;
   an insulating plastic and is coated with an electrically conductive coating; and
   electrically conductive plastic.

4. The integrated gas discharge lamp as claimed in claim 1, wherein the integrated gas discharge lamp is used in a headlamp or in a working spotlight in a vehicle.

5. The integrated gas discharge lamp as claimed in claim 1, wherein the integrated gas discharge lamp is used in a pocket lamp or in a portable searchlight.

6. The integrated gas discharge lamp as claimed in claim 1, wherein the integrated gas discharge lamp is supplied with energy by at least one of a battery and a fuel cell system.

7. The integrated gas discharge lamp as claimed in claim 1, wherein the integrated gas discharge lamp, in the stationary operation mode, after the ignition and start-up phase, is operated such that an electrical power between 7 W and 50 W is supplied to the gas discharge lamp burner.

8. The integrated gas discharge lamp as claimed in claim 1, wherein the volume of the integrated gas discharge lamp is between 44 cm3 and 280 cm3.

9. The integrated gas discharge lamp as claimed in claim 1, wherein the integrated gas discharge lamp has a ratio of diameter to height, which is in the range between 0.8 to 10.

10. The integrated gas discharge lamp as claimed in claim 1, wherein the integrated gas discharge lamp has a mass, which is in the range between 36 g to 510 g.

11. The integrated gas discharge lamp as claimed in claim 1, wherein the lamp base of the integrated gas discharge lamp comprises a seal at the burner-side end, which terminates an optical system, which is coupled to the integrated gas discharge lamp, in a water-proof manner.

12. The integrated gas discharge lamp as claimed in claim 11, wherein the seal effects a pre-stressing on the reference ring at the same time such that the integrated gas discharge lamp is retained in built-in position with respect to the optical system.

13. The integrated gas discharge lamp as claimed in claim 1, wherein the ignition electronics and the operation electronics of the integrated gas discharge lamp are arranged on different planes in the base.

14. The integrated gas discharge lamp as claimed in claim 13, wherein an at least one of an electrically and thermally conductive plate is mounted between the ignition electronics and the operation electronics.

15. The integrated gas discharge lamp as claimed in claim 14, wherein the ignition electronics and the operation electronics of the integrated gas discharge lamp are arranged in one common plane.

16. The integrated gas discharge lamp as claimed in claim 1, wherein the integrated gas discharge lamp comprises a base plate, which comprises at least one of electrically conductive material; thermally conductive material; and a thermally conductive material, which is provided with an electrically conductive coating.

17. The integrated gas discharge lamp as claimed in claim 16, wherein the base plate comprises a coating at its outer side, which results in an increased heat radiation.

18. The integrated gas discharge lamp as claimed in claim 16, wherein the base and the base plate of the integrated gas discharge lamp are coupled by means of at least one of a crimp coupling; a catch lock coupling; an ultrasonic weld coupling; a solder coupling; and a weld coupling.

19. The integrated gas discharge lamp as claimed in claim 16, wherein the operation electronics is arranged on a printed circuit board, which comprises a circumferentially electrically conductive ring at its edge, and the base and the base plate respectively comprises at least one wall, which cooperate such that the electrically conductive ring rest at least partially on both walls and the printed circuit board is mechanically fixed and the electrically conductive ring is electrically conductively coupled to at least one of the base plate and the base.

20. The integrated gas discharge lamp as claimed in claim 16, wherein the operation electronics is arranged on a surface of the base plate which faces the gas discharge lamp burner.

21. The integrated gas discharge lamp as claimed in claim 20, wherein the base plate comprises, on a surface facing away from the gas discharge lamp burner, a surface increasing structure, which promotes a natural convection in built-in position.

* * * * *